United States Patent [19]

Moura et al.

[11] Patent Number: 5,818,845
[45] Date of Patent: *Oct. 6, 1998

[54] HYBRID ACCESS SYSTEM HAVING CHANNEL ALLOCATION AND PRIORITIZED POLLING SCHEMES

[75] Inventors: Eduardo J. Moura, San Joe; Jan Maksymilian Gronski, Palo Alto, both of Calif.

[73] Assignee: Hybrid Networks, Inc., Cupertino, Calif.

[*] Notice: The term of this patent shall not extend beyond the expiration date of Pat. No. 5,586,121.

[21] Appl. No.: 588,378

[22] Filed: Jan. 18, 1996

Related U.S. Application Data

[62] Division of Ser. No. 426,920, Apr. 21, 1995, Pat. No. 5,586,121.

[51] Int. Cl.⁶ .................................................. H04J 3/16
[52] U.S. Cl. ........................... 370/449; 370/285; 370/404; 370/911
[58] Field of Search ................................. 370/95.2, 85.8, 370/60, 94.1, 36, 37, 85.2, 85.13, 31, 84, 85.5, 60.1, 449, 296, 422, 232, 389, 352, 394, 285, 275, 911, 276, 445, 404, 452; 379/59; 358/85; 340/825.08; 348/7, 10; 455/4.2, 5.1, 3.1

[56] References Cited

U.S. PATENT DOCUMENTS

| 4,771,417 | 9/1988 | Maxwell et al. | 370/31 |
|---|---|---|---|
| 5,130,983 | 7/1992 | Heffner, III | 370/85.6 |
| 5,247,347 | 9/1993 | Litteral et al. | 358/85 |
| 5,276,703 | 1/1994 | Budin et al. | 370/85.2 |
| 5,291,543 | 3/1994 | Freese et al. | 379/59 |
| 5,375,055 | 12/1994 | Togher et al. | 364/408 |
| 5,446,490 | 8/1995 | Blahut et al. | 348/10 |
| 5,455,959 | 10/1995 | Simmering | 370/85.5 |
| 5,473,599 | 12/1995 | Li et al. | 370/85.13 |
| 5,485,197 | 1/1996 | Hoarty | 348/7 |
| 5,485,464 | 1/1996 | Strodtbeck et al. | 370/95.2 |
| 5,515,359 | 5/1996 | Zheng | 370/60.1 |
| 5,544,161 | 8/1996 | Bigham et al. | 348/7 |
| 5,572,517 | 11/1996 | Safadi | 348/12 |

Primary Examiner—Douglas W. Olms
Assistant Examiner—Shick Hom
Attorney, Agent, or Firm—Farkas & Manelli

[57] ABSTRACT

An asymmetric network communication system for use in a client-server environment having independent forward and return channels operating at different speeds and/or under different protocols on the same or different communication media to provide efficient utilization of shared resources. A network manager, such as a hybrid access system, effects transmission of packetized data on a forward (downstream) channel from the host server to multiple client devices coupled with a shared downstream media at 10 or more megabits per second while simultaneously providing selectable multiple lower speeds of operation on shared or dedicated return (upstream) channels from the client devices to the host server depending on bandwidth availability, bandwidth demand, service level authorization, etc. for the return channel. Forward and return channels may be located on the same or different communication medium including a CATV network, direct broadcast satellite network, television or radio RF broadcast network, wireless or mobile cellular facilities or the like. The return channel may reside on a PSTN either directly coupled with the host server or connected with the network manager for subsequent transmission to the host server. The network manager handles or controls the forward and return communication to establish interactive full-duplex real-time network sessions between the host and plural client devices. The network manager effects upstream channel allocation in response to channel allocation requests and prioritizes polling wherein the polling cycles or periods differ among respective groups of client devices, depending on their state of operation.

144 Claims, 20 Drawing Sheets

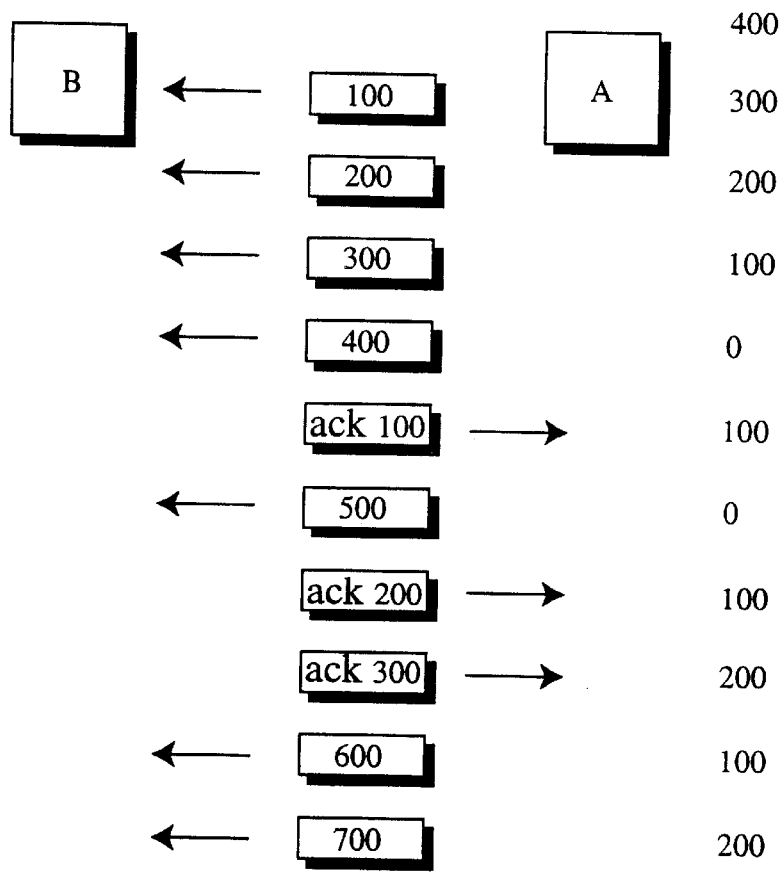
FIGURE 14a
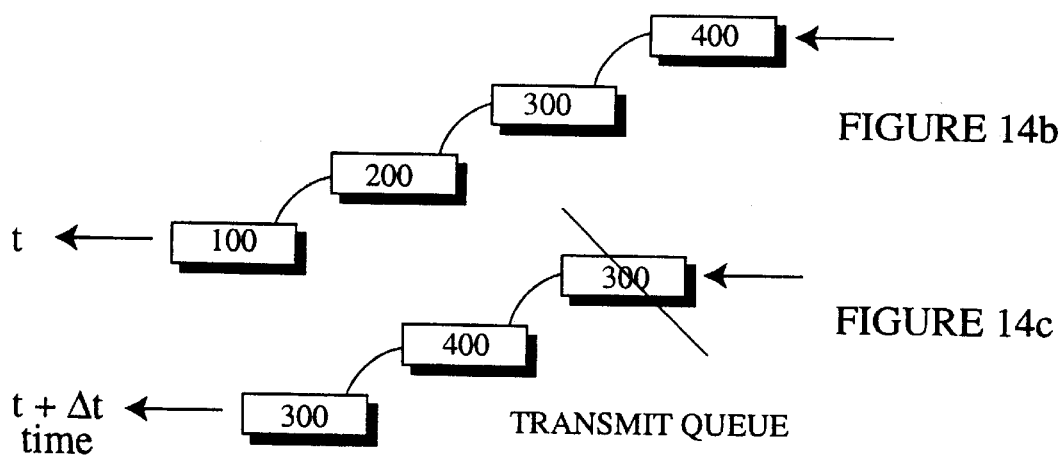
FIGURE 14b
FIGURE 14c

HYBRID ACCESS SYSTEM HAVING CHANNEL ALLOCATION AND PRIORITIZED POLLING SCHEMES

This is a divisional of application Ser. No. 08/426,920 filed on Apr. 21, 1995, now U.S. Pat. No. 5,586,121.

FIELD OF INVENTION

This invention relates to systems and methods for extending a high-speed network to remote locations using an asymmetric hybrid access system.

BACKGROUND OF THE INVENTION

Current data communication systems typically use symmetric communication paths between transmit and receive sites, which have substantially the same data rates and use the same media in both directions. Such media may include coaxial, fiber optic, or telephone twisted-pair lines. Some networks alternatively use broadcast only paths. However, no current network combines the flexibility of full-duplex symmetric networks with the cost effectiveness of broadcast only networks.

Prior attempts at achieving asymmetric data communications included modems with very low speed return channels or systems combining a low speed broadcast channel with telephone return lines. However, no prior systems were able to extend a symmetric high-speed backbone network to remote locations at high speeds using an asymmetric hybrid access system. Known prior asymmetric systems are limited to low speed links.

It is desirable to develop a network which combines the flexibility of a full-duplex network with the effectiveness of a broadcast network at a reasonable cost.

SUMMARY OF THE INVENTION

According to the present invention, a high speed backbone network is extended for communications with remote locations with a hybrid asymmetric architecture having fully interactive duplex characteristics and including independent upstream and downstream communication paths operable at separately selectable speeds and protocols. According to one embodiment of the present invention, the hybrid asymmetric architecture includes 6 Megahertz television channels downstream and telephone lines for upstream communications. Alternative downstream communications can be accomplished according to the invention with a selected high bandwidth broadband service, including for example high definition television (HDTV). Downstream communications according to another embodiment can be implemented with a selected low cost, high speed broadband modem. Downstream communications can provide access to data from information sources including companies, government agencies, universities, libraries, and the like. Alternative upstream communications can be accomplished by a narrow band cable TV return channel, ISDN, radio, or a selected low-cost, low to medium speed telephone modem. The asymmetric hybrid system according to the present invention includes an interface with the backbone network connected to selected information sources. The interface includes point of presence (POP) circuits implementing high speed downstream communications with lower speed upstream communications. The interface connects the backbone network with cable TV head ends, TV transmitters, cell sites, remote users, and upstream and downstream channels.

The present invention further includes a hybrid access configuration which uses both downstream and upstream channels. The present invention further includes a hybrid access configuration which uses downstream wireless TV channels and upstream public switch telephone network (PSTN), wireless RF communications or integrated services digital network (ISDN) telephone lines. The present invention further includes a hybrid access configuration which uses both downstream and upstream cable TV channels. The present invention further includes a hybrid access configuration which has downstream satellite TV channels and upstream public switch telephone network (PSTN), wireless RF communications, or integrated services digital network (ISDN) telephone lines.

The present invention further includes packet and acknowledge suppression methods to eliminate redundant packet, byte, and acknowledge transmissions in a hybrid access system. A packet is defined as an information unit containing one or more bytes of information. Particularly according to the method of the present invention, a certain amount or number of data packets or bytes are enqueued or transmitted in a transmit-ahead window. Transmission of a window of bytes or packets is followed by a predetermined time-out period while the transmit queue awaits acknowledgments of packets received. To the extent receipt acknowledgments are received as to particular bytes or packets, these packets and bytes in the transmit queue will be deleted from the transmit queue, and the transmit queue is open to receipt of further packets or bytes for emplacement in slots of the transmission queue for the deletions made. With respect to acknowledgments placed in a transmission queue, indications acknowledging receipt of later bytes and packets supersede acknowledgments of earlier transmitted bytes or packets. Accordingly, under the present invention, the earlier acknowledgments are deleted from an acknowledge transmission queue.

The present invention further includes an automatic address allocation and configuration method in transmissions employing a hybrid access system. According to the present invention, remote users are identified initially with an abstract name, e.g., "Bob," and this abstract name is registered by the network management system. Configuration is established by the downstream routers polling the remote users and registering the location of the remote user responding to the poll made with the particular abstract name. Internet Protocol address and upstream channel allocation is accordingly accomplished subject to the configuration made including abstract name and identified location.

The present invention further includes a prioritized polling method in transmissions employing a hybrid access system. According to a method of the present invention, hybrid upstream routers poll client devices such as remote link adapters (i.e., "RLAs") according to predetermined priority levels. According to one embodiment of the present invention, priority levels are established for state categories of RLAs. According to one embodiment of the present invention, priority level states include status states such as idle, non-responsive, requesting channel(s), active, or active-credit. According to one embodiment of the present invention, RLAs which request a channel are prioritized according to the amount of time its channel requests have gone unfulfilled. According to one embodiment of the present invention hybrid upstream routers poll downstream RLAs which are idle more frequently than non-responsive RLAs.

The present invention further includes an automatic gain adjustment technique in transmissions employing a hybrid access system, according to which a remote link adapter sends successive indications to a hybrid upstream router at selected different power levels. When a power level indication is received by a hybrid upstream router, the receiving hybrid upstream router confirms receipt of such indication to the sending remote link adapter which then registers an associated power level as qualified. According to one embodiment of the present invention, the selected different power levels are dynamically adjusted in magnitude of transmission level.

The present invention further includes a quality-based upstream channel allocation technique in transmissions employing a hybrid access system. According to the technique, the hybrid upstream router first determines the availability of upstream cable channels by a frequency agile RLA setting a wide range of narrowband upstream channels. The upstream router then makes a quality assessment of available channels in view of most recent demand, and it finally selects an upstream channel in view of the quality assessment made. Quality assessment includes determination of busy status and signal characteristics including error rates, noise floor, and signal to noise ratio. Upstream channels are releasable according to inactivity or time-out criteria, according to which release or reassignment occurs responsive to inactivity for over a threshold period. Inactivity is assessed by the hybrid upstream router monitoring operability indications and data packets received from assigned RLAs.

The present invention further includes a credit allocation technique in transmissions employing a hybrid access system. According to a method of the present invention, an upstream channel is shared by a plurality of RLAs in accordance with a credit criterion, and credit control packets are dispatched to a RLA which permit the RLA to send data packets to arbitrary hosts. Upon sending a data packet, the RLA returns the credit control packet to a server containing software including Hybridware™ code which manages data flows. The Hybridware™ code or Hybridware™ server, according to one embodiment of the present invention, includes software distributed among data processors in the upstream and downstream routers and elsewhere in the HASPOP, including for example in the network management system.

DESCRIPTION OF THE DRAWINGS

FIG. 14a is a diagram of a sequential data transmission between first and second network nodes, according to the present invention;

FIG. 14b is a diagram of the contents of a conventional transmission queue in the downstream node during a first time period;

FIG. 14c shows the contents of a transmission queue in a downstream node during a later time period, eliminating retransmission of the 300 packet, according to the present invention, because another 300 packet was already in the transmission queue;

DESCRIPTION OF THE PREFERRED EMBODIMENT

Figure 1:
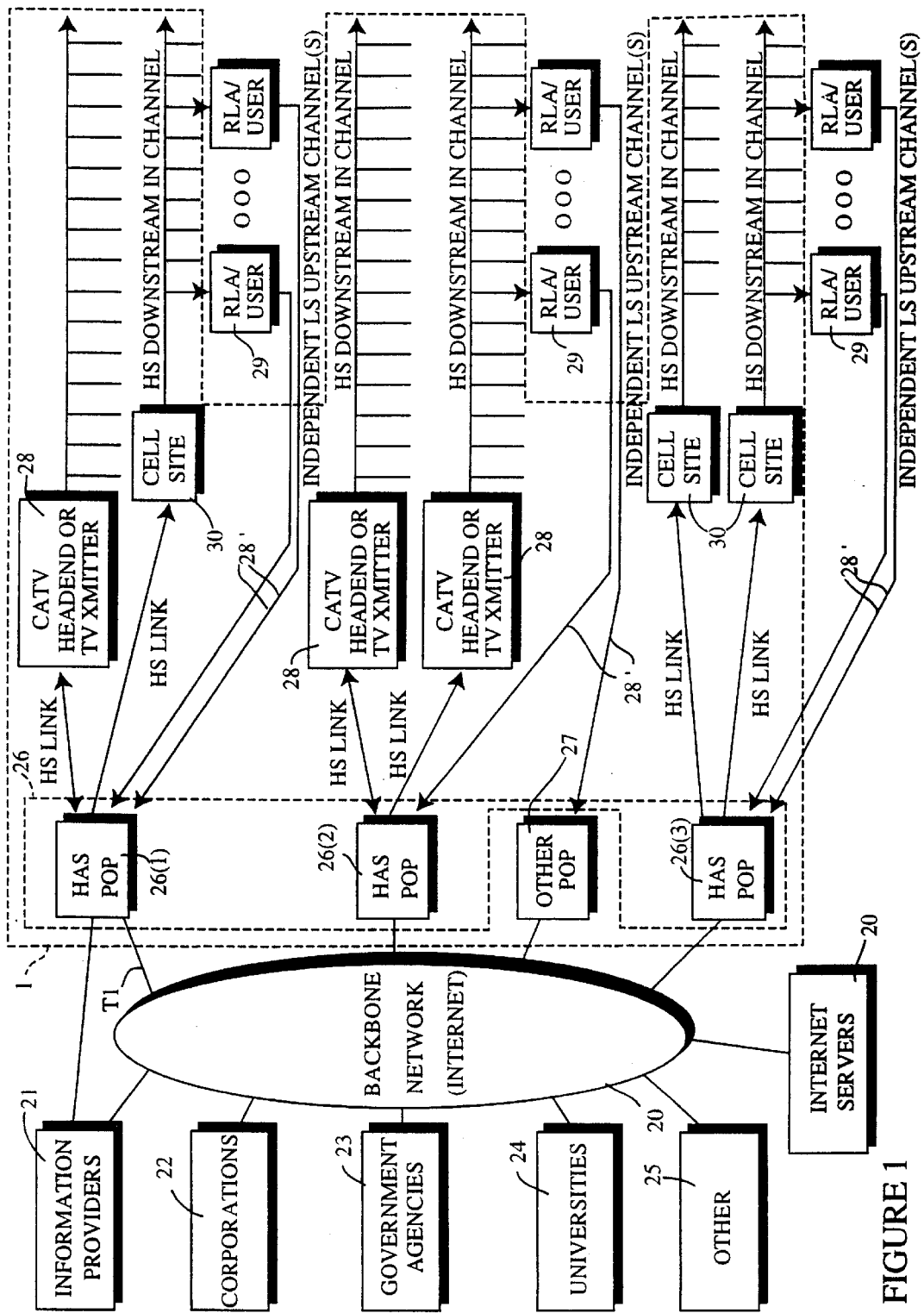
FIG. 1 is a detailed schematic drawing of a hybrid access system connected to a backbone network such as the Internet, and having points of presence connecting the backbone network to cable TV headends, TV transmitters, or Logical Nodes (e.g., cell sites), with remote users connecting to an RLA which in turn connects to downstream TV channels and independent lower speed upstream channels.

FIG. 1 is a detailed schematic drawing of a hybrid access system 1 according to the present invention, showing a RLA and user workstation 29 connected through hybrid access system 1 to a variety of entities connected to a backbone network 20 such as Internet, including information providers 21, corporations 22, government agencies 23, universities 24, and others 25. A backbone network is one which is typically not directly connected to a user. Hybrid access system 1 according to an embodiment of the present invention includes hybrid access system (HAS) points of presence (POPs) 26 and other points of presence 27. HASPOPs 26 include individual HASPOPs 26(1)–26(3) which enable communication over a broadband network, either by upstream and downstream cable communications or by downstream cable and upstream telephone communications or various other hybrid configurations (e.g., wireless or satellite). The present invention particularly includes (1) a hybrid access configuration which uses downstream cable TV channels and upstream public switch telephone network (PSTN), wireless RF communications or integrated services digital network (ISDN) telephone lines; (2) a hybrid access configuration which uses downstream wireless TV channels and upstream public switch telephone network (PSTN), wireless RF communications or integrated services digital network (ISDN) telephone lines; (3) a hybrid access configuration which uses both downstream and upstream cable TV channels; (4) a hybrid access configuration which uses both downstream and upstream wireless channels; and (5) a hybrid access configuration with downstream satellite channels and upstream PSTN, wireless RF communications or ISDN telephone channels.

Backbone network 20 such as the Internet which includes a plurality of Internet servers 20 connected to HASPOPs 26 each including a plurality of host computers and/or servers, collectively referred to as hybrid servers. Hybrid access system I further includes broadcast units such as, a cable television (TV) head end 28, independent upstream channels 28'; and a RLA 29. U.S. Pat. No. 5,347,304 (1994) assigned to Hybrid Networks, Inc., and describing an example of an RLA is hereby expressly referenced and incorporated herein in its entirety. An RLA may receive analog broadcast signals including encoded digital information which the RLA decodes and provides to a data terminal or computer. According to an embodiment of the present invention, the downstream flow of information proceeds from HASPOPs 26(1)–26(3) through cable TV head end or TV transmitters 28 or cell sites 30 and through RLA and user workstation 29. Upstream information flow proceeds in one case from RLA and user workstation 29 through independent upstream channels 28'; to HASPOP 26(1), and then to backbone network 20; along T1 or T3 or other digital lines. In another case, upstream information proceeds from user workstation through RLA 29 through the cable TV network, and cable TV head end 28 to hybrid access system point of presence and then through T1, T3, or other digital lines to backbone network 20. The outputs of the cable TV headends or TV transmitters 28 include pluralities of high speed downstream broadband radio frequency, i.e., RF, channels connected to respective remote users 29. Hybrid access system 1 further includes a plurality of cell sites 30 connected through high speed links to a corresponding hybrid access system point of presence 26. The outputs of cell sites 30 include pluralities of high speed downstream broadband channels connected to selected remote users 29. A particular remote user 29 can be connected via an independent lower speed upstream channel to a hybrid access system point of presence 26 as discussed below or via a similar independent lower speed upstream channel to another point of presence system 27. By lower speed it is meant at a speed reduced from the speed of the high speed link used to transmit information downstream. A particular hybrid access system point of presence 26 can be connected via duplex high speed links to a plurality of cable TV headends or TV transmitters, to a plurality of cell sites 30, or a combination of cable TV headends or TV transmitters 28 and cell sites 30.

Figure 2A:
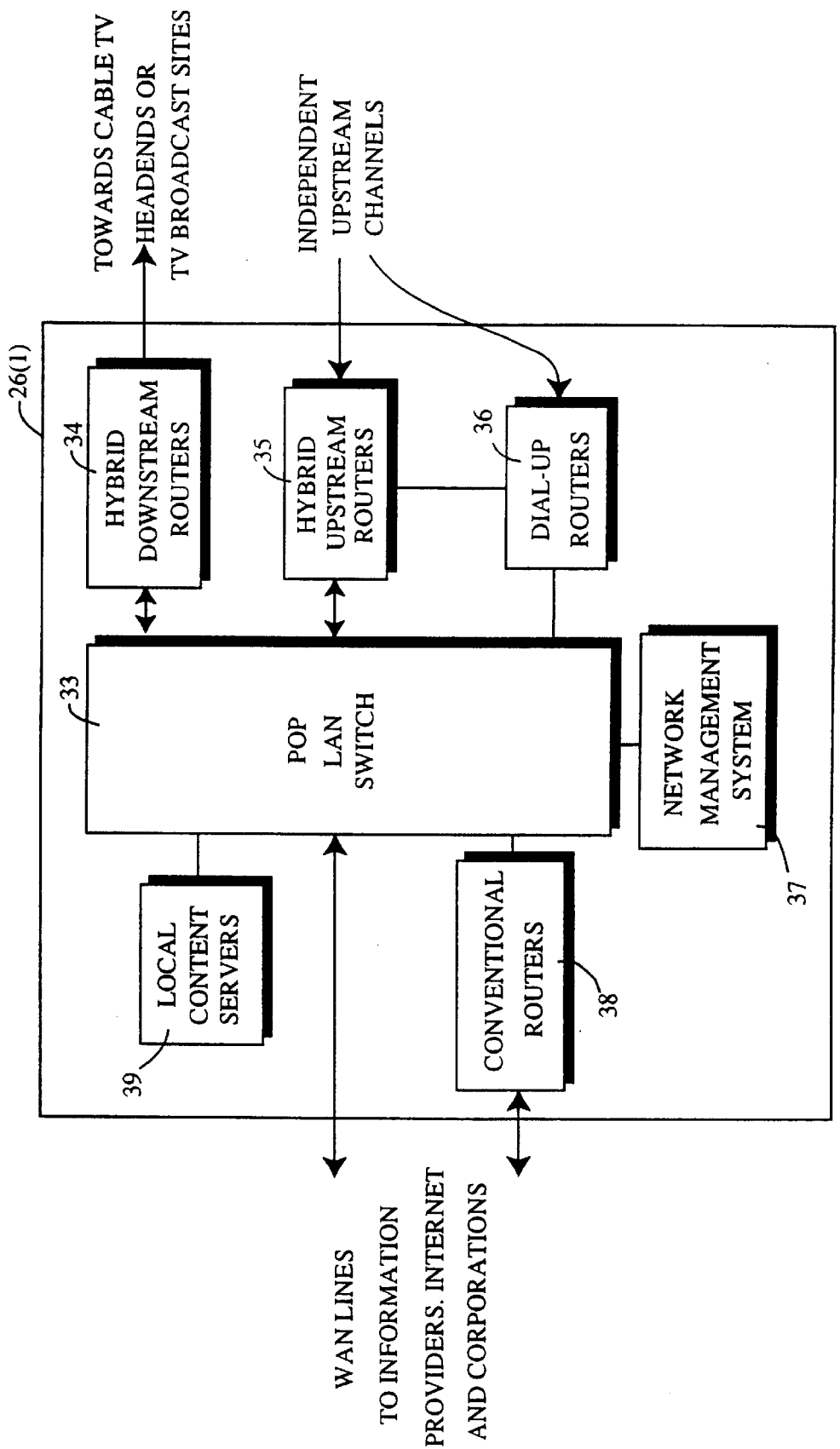
FIG. 2a is a schematic drawing of a hybrid access system point of presence (POP) according to the present invention including at least a single host computer or server and at least a single router including a hybrid downstream router, a hybrid upstream router, a dial-up router, an Internet router, or a backbone network router, and a POP LAN switch.

FIG. 2a is a schematic drawing of a point of presence (POP) system 26(1) according to the present invention, including host computers or servers 39 and a POP local area network, i.e., LAN switch 33 to which host computers or servers 39 are connected. Further connected to LAN switch 33 are one or more downstream and one or more upstream hybrid access system point of presence routers, respectively 34 and 35, one or more dial-up routers 36, a network management system 37, and conventional routers 38. Connected to POP LAN switch 33 are one or more data storage elements or systems. Each downstream hybrid access system point of presence router 34 is connected with a high speed link to a TV transmitter or cable TV headend, for example. Further, each upstream hybrid access system point of presence router 35 is connected to a plurality of independent upstream channels, which operate at a lower speed than the downstream high speed links to TV transmitters or cable TV headends. Each dial-up router 36 is connected to a plurality of independent upstream channels operating at a lower speed than the indicated downstream high speed links. Each conventional router 38 is connected along a high speed line to wide area network (WAN) lines to selected information providers, Internet, or other nodes or businesses. POP LAN switch 33, according to one embodiment of the present invention is connected directly along a high speed line to wide area network (WAN) lines to selected information providers, Internet, or other nodes or businesses.

Figure 2B:
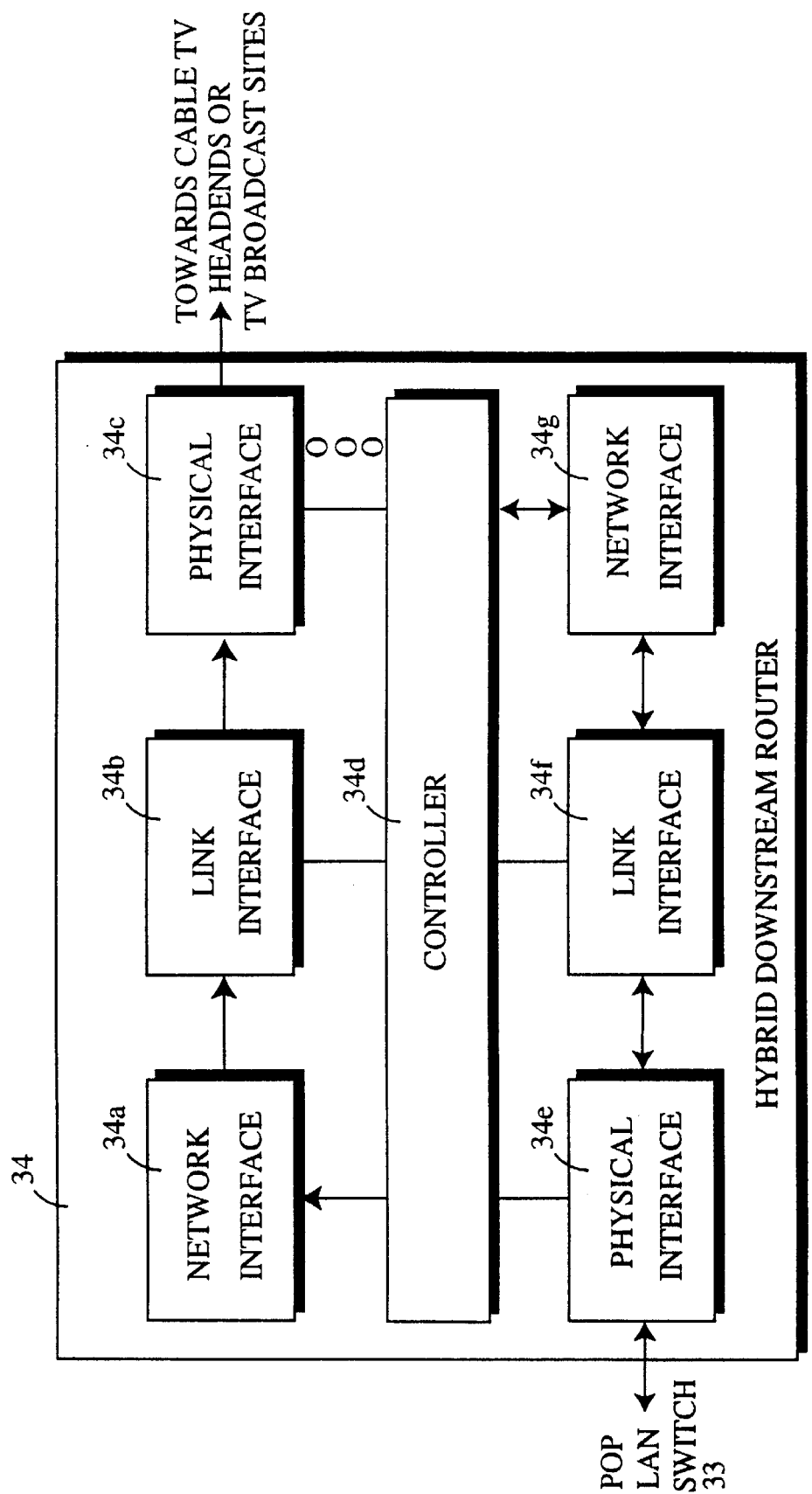
FIG. 2b is a block diagram of a downstream router according to the present invention.

FIG. 2b is a block diagram of hybrid downstream router 34 according to the present invention. In particular, downstream router 34 includes network interface 34a, link interface 34b, physical interface 34c, controller 34d, physical interface 34e, link interface 34f, and network interface 34g. Downstream router 34 and physical interface 34e are connected to POP LAN switch 33 for sending and receiving information, and physical interface 34e, link interface 34f, and network interface 34g are serially connected to each other and to controller 34d for bidirectional communication of selected information. Additionally, controller 34d is connected directly to each of physical interface 34e and link interface 34f along indicated lines to accomplish control and messaging functions. Downstream router 34 and physical interface 34c are connected to cable TV headends, TV broadcast sites, cell cites or the like, to communicate information primarily or exclusively in a unidirectional or downstream direction, and physical interface 34c, link interface 34b, and network interface 34a are serially connected to each other and to controller 34d for selected communication of selected information. Additionally, controller 34d is connected directly to each of physical interface 34c and link interface 34b along indicated lines to accomplish control and messaging functions. Downstream router 34 may include one or more of physical interfaces 34c. According to an embodiment of the present invention, router 34 may be a bridge without network interfaces 34a and 34g or a connection without network interfaces 34a and 34g and without link interfaces 34b and 34f. According to yet another embodiment of the present invention, router 34 can be a gateway.

Figure 2C:
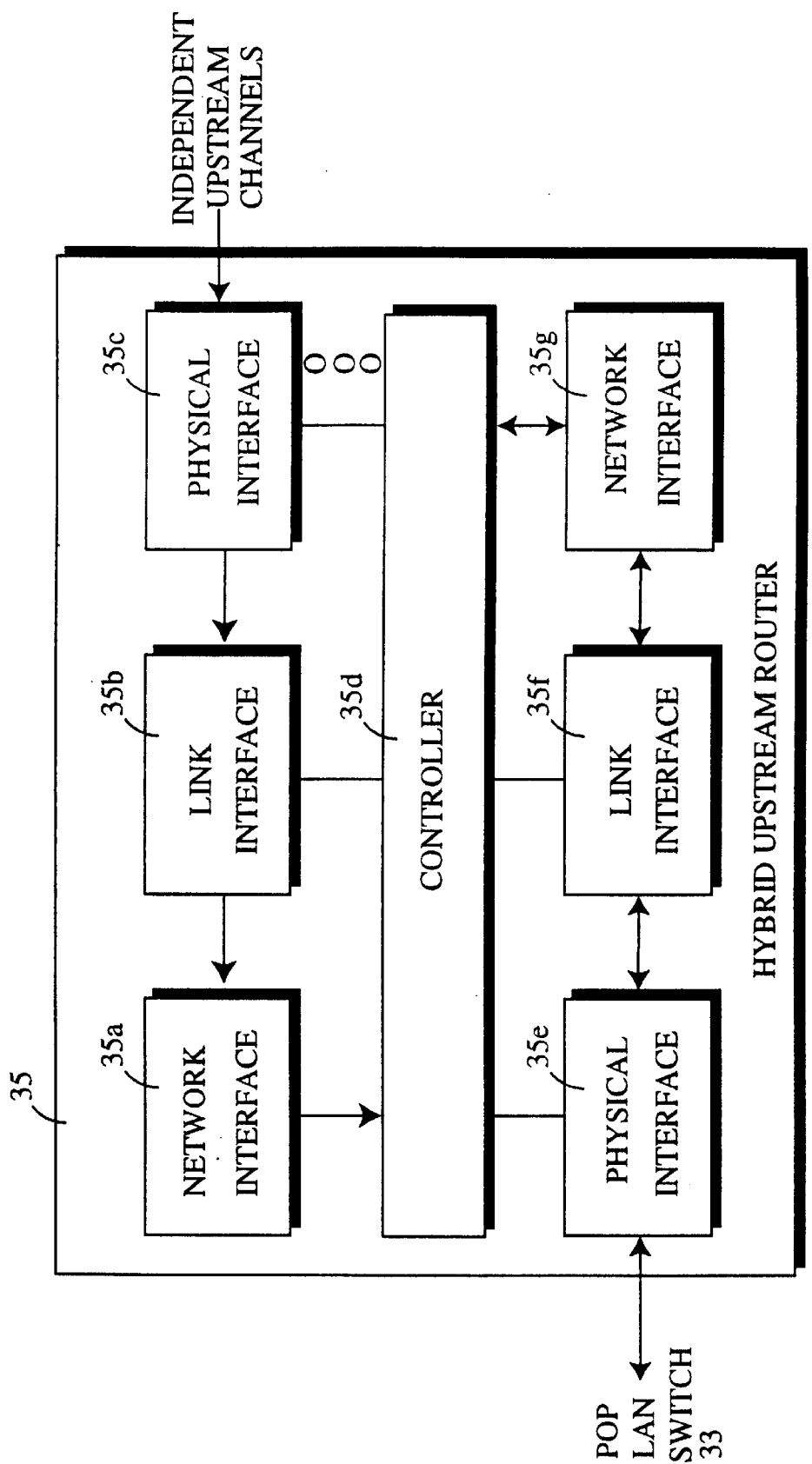
FIG. 2c is a block diagram of an upstream router according to the present invention.

FIG. 2c is a block diagram of upstream router 35 according to the present invention. In particular, upstream router 35 includes network interface 35a, link interface 35b, physical interface 35c, controller 35d, physical interface 35e, link interface 35f, and network interface 35g. Upstream router 35 and physical interface 35e are connected to POP LAN switch 33 for sending and receiving information, and physical interface 35e, link interface 35f, and network interface 35g are serially connected to each other and to controller 35d for bidirectional communication of selected information. Additionally, controller 35d is connected directly to each of physical interface 35e and link interface 35f along indicated lines to accomplish control and messaging functions. Upstream router 35 and physical interface 35c are connected to upstream channels, e.g., telephone links for example, to communicate information primarily or exclusively in a unidirectional or upstream direction, and physical interface 35c, link interface 35b, and network interface 35a are serially connected to each other and to controller 35d for selected communication of selected information. Additionally, controller 35d is connected directly to each of physical interface 35c and link interface 35b along indicated lines to accomplish control and messaging functions. Upstream router 35 may include one or more of physical interfaces 35c. According to an embodiment of the present invention, router 35 may be a bridge without network interfaces 35a and 35g or a connection without network interfaces 35a and 35g and without link interfaces 35b and 35f. According to yet another embodiment of the present invention, router 35 can be a gateway.

Figures 3A, 3B, 3C:
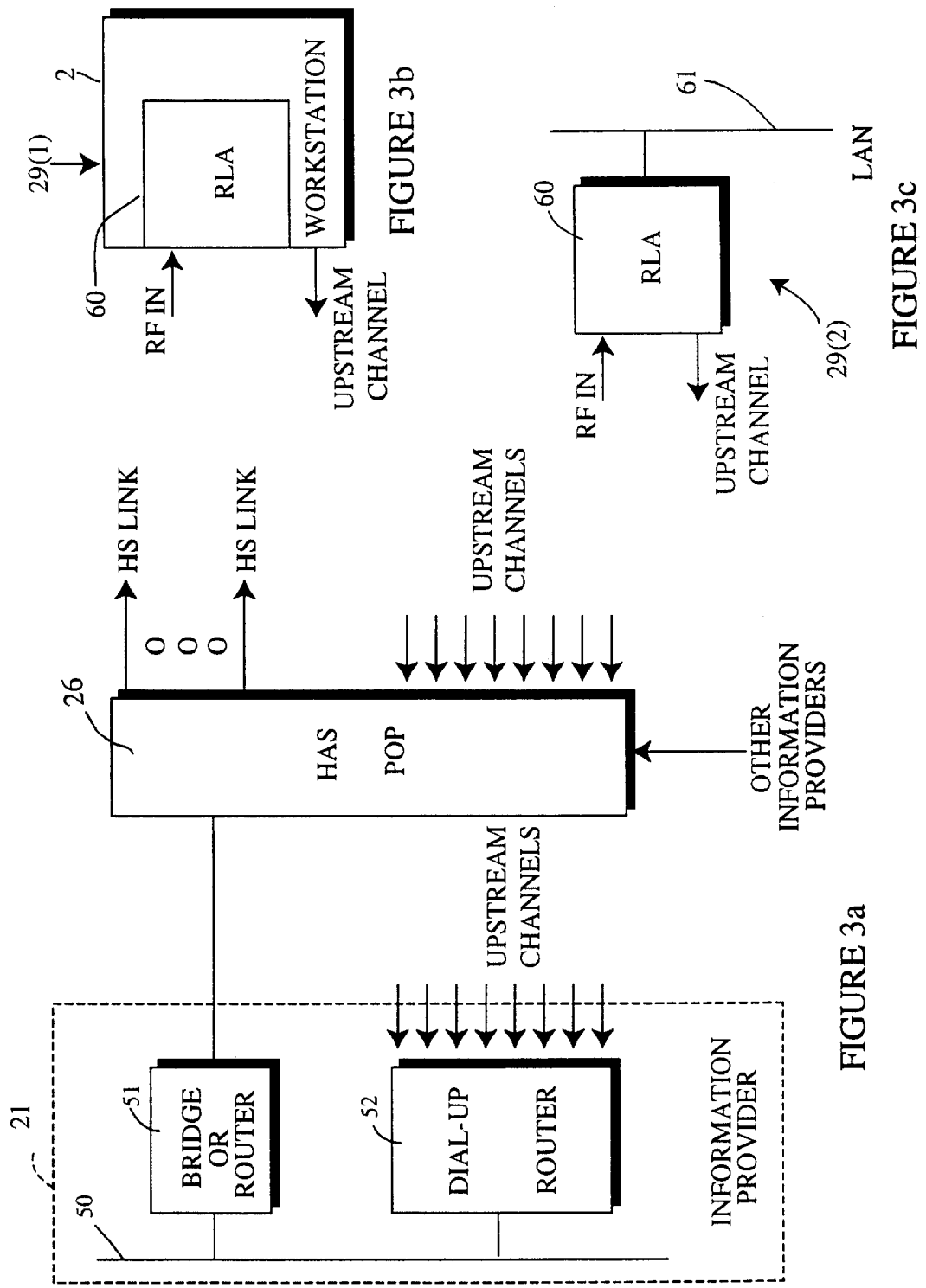
FIGS. 3a, 3b, and 3c comprise a pictorial diagram of a hybrid access system according to the present invention according to which a remote user can communicate with an information provider through the hybrid access system.

FIGS. 3a–3b are drawings of a hybrid access system 1 according to the present invention according to which a remote user having a workstation 2 or is connected to LAN 61, as shown respectively in FIGS. 3b and 3c, can communicate with a selected information provider 21 including LAN 50, bridge or router 51 connected to LAN 50, and dial-up router 52 connected to LAN 50 through a hybrid access system point of presence 5. Further, the HAS POP is connected along a high speed link to bridge or router 51. Additionally, HAS POP 5 is linked to other information providers to receive selected information items. Additionally, dial-up router 52 is connected to a plurality of upstream channels. FIG. 3b and 3c additionally show respective first and second users, in one case including workstation 2 in turn including a RLA 60 and in the other instance including RLA 60 and a local area network (LAN) 61 connected to RLA 60. First user 29(1) is connected to an upstream channel from user workstation 2, and second user 29(2) is connected to an upstream channel directly from RLA 60. In the case of each user, RLA 60 receives input information, particularly radio frequency (RF) information along one of respective input channels connected thereto.

Figure 4:
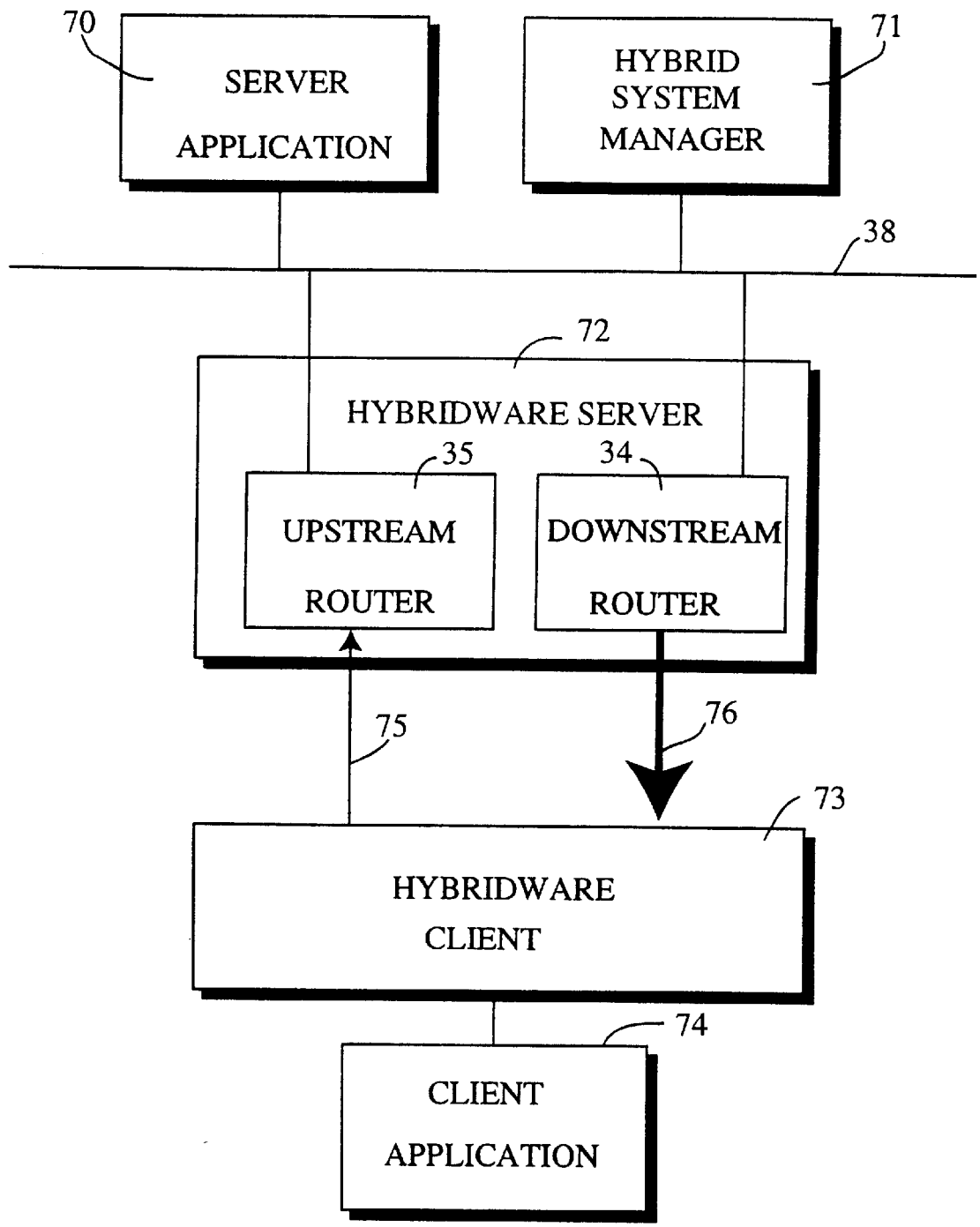
FIG. 4 is a logical data flow diagram showing data flows between a server and a client computer of the hybrid access system according to the present invention.

FIG. 4 is a logical data flow diagram showing data flows between a server and a client computer of the hybrid access system 1 according to the present invention. Hybrid access system 1 includes a server application 70, a hybrid system manager 71, and a Hybridware™ server 72 connected to LAN 38. Hybrid access system 1 further includes a Hybridware™ client 73 and a client application 74 operating with Hybridware™ client 73. Hybridware™ client 73 communicates with Hybridware™ server 72, as transmitter along upstream channel 75 or as receiver along downstream channel 76. Downstream data traffic is expected to be higher capacity than upstream data traffic: Hence, the bolder depiction of downstream channel 76 than upstream channel 75.

Figure 5:
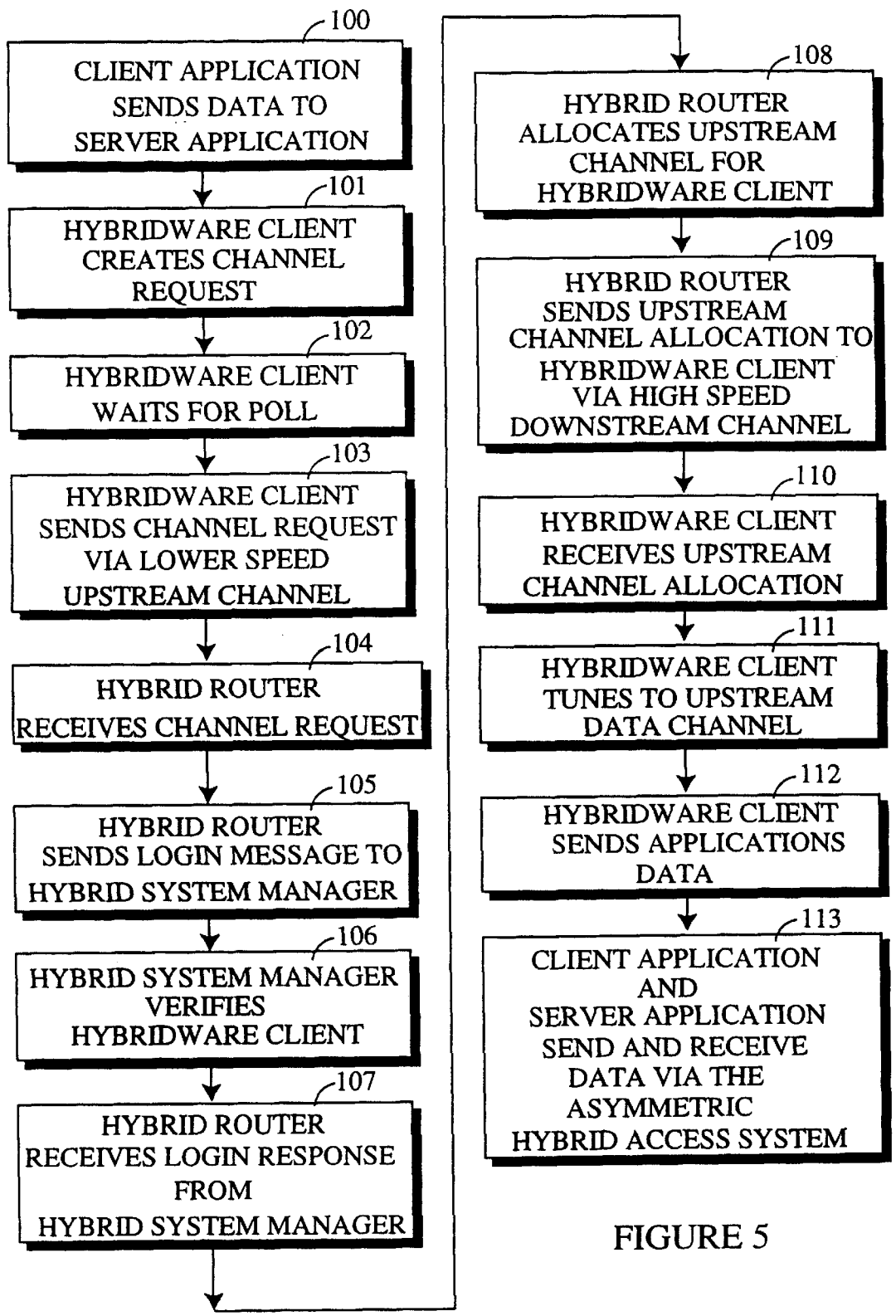
FIG. 5 is a flow chart of operation of a two-way cable network embodiment of the hybrid access system according to the present invention.

FIG. 5 is a flow chart of operation of a two-way cable network embodiment of hybrid access system 1 according to a hybrid protocol embodiment of the present invention. In particular, according to one embodiment of the hybrid protocol of the present invention, client application 74 sends 100 data to server application 70 in an upstream direction, thereby issuing a connection request. Hybridware™ client 73 buffers the data received and checks if it controls an upstream data channel. If it does, then the data is transmitted forthwith. If it doesn't, Hybridware™ client 73 queues up the data message and creates 101 a channel request for a particular subchannel within upstream channel 75. Hybridware™ client 73 then waits 102 for a poll from Hybridware™ server 72, i.e., Hvbridware™ router. According to an embodiment of the present invention, prioritized polling is conducted whereby not all clients are polled at the same frequency. Clients in an idle state are polled relatively frequently. Clients in blocked and NON-RESP states are polled but not at the same relatively high frequency. Clients in an ACTIVE state are not polled at all. This is based on the assumption that an active client has what it wants and that it is most important to respond quickly to new connections coming from clients in an IDLE state. Those clients coming from a NON_RESP cycle receive second order attention and can wait a little longer, since they may have already been in a state where communication are impossible and may have been in that state for a considerable period of time. According to one embodiment of the present invention, a poll cycle is the smallest period such that all but active clients are polled at least once. Idle clients may be polled multiple times during one poll cycle. Blocked and non_resp clients are distributed evenly across the poll cycle to assure that the latency for acquiring a channel for idle units is uniform. All clients are grouped according to their state and polled within each group according to the round robin approach according which each of a series is polled in sequence and then the same sequence is repeatedly polled individual by individual. Upon receipt of a poll, Hybridware™ client 73 sends 103 a channel request via lower speed upstream channel 75. Hybridware™ router 72, i.e., server, receives 104 the channel request from Hybridware™ client 73 and initially sends 105 a login message to Hybridware™ system manager 71. Hybridware™ system manager 71 verifies 106 that Hybridware™ client 73 is an authorized user of data processing services on the particular node or system within which hybrid access system 1 operates. Then, Hybridware™ router 72 receives 107 a login response message from Hybridware™ system manager 71 through LAN 38, which indicates whether the client is allowed to operate on the particular network and which contains other operating characteristics of Hybridware™ client 73. Hybridware™ router 72 then allocates 108 (see state diagrams of FIGS. 7 and 8) an upstream channel 75 for Hybridware™ client 73, depending on channel availability and suitability. Suitability depends on factors including but not limited to channel quality, type of service required, operating characteristics of Hybridware™ client 73, configuration restrictions, and the like. Hybridware™ router 72 sends 109 an upstream channel allocation message to Hybridware™ client 73 via high speed downstream channel 76, which may according to one embodiment of the present invention specify the frequency on which Hybridware™ client 73 is permitted to transmit. Thereafter, Hybridware™ client 73 receives 10 an upstream channel allocation. Next, Hybridware™ client 73 tunes 111 to the specifically allocated upstream data channel frequency on which it is permitted to transmit data. Finally, Hybridware™ client 73 sends 112 the selected application data from client application 74. Accordingly, client application 74 and server application 70 are able to send and receive 113 data via upstream bandwidth management of an asymmetric hybrid access system, according to the present invention.

Figure 6:
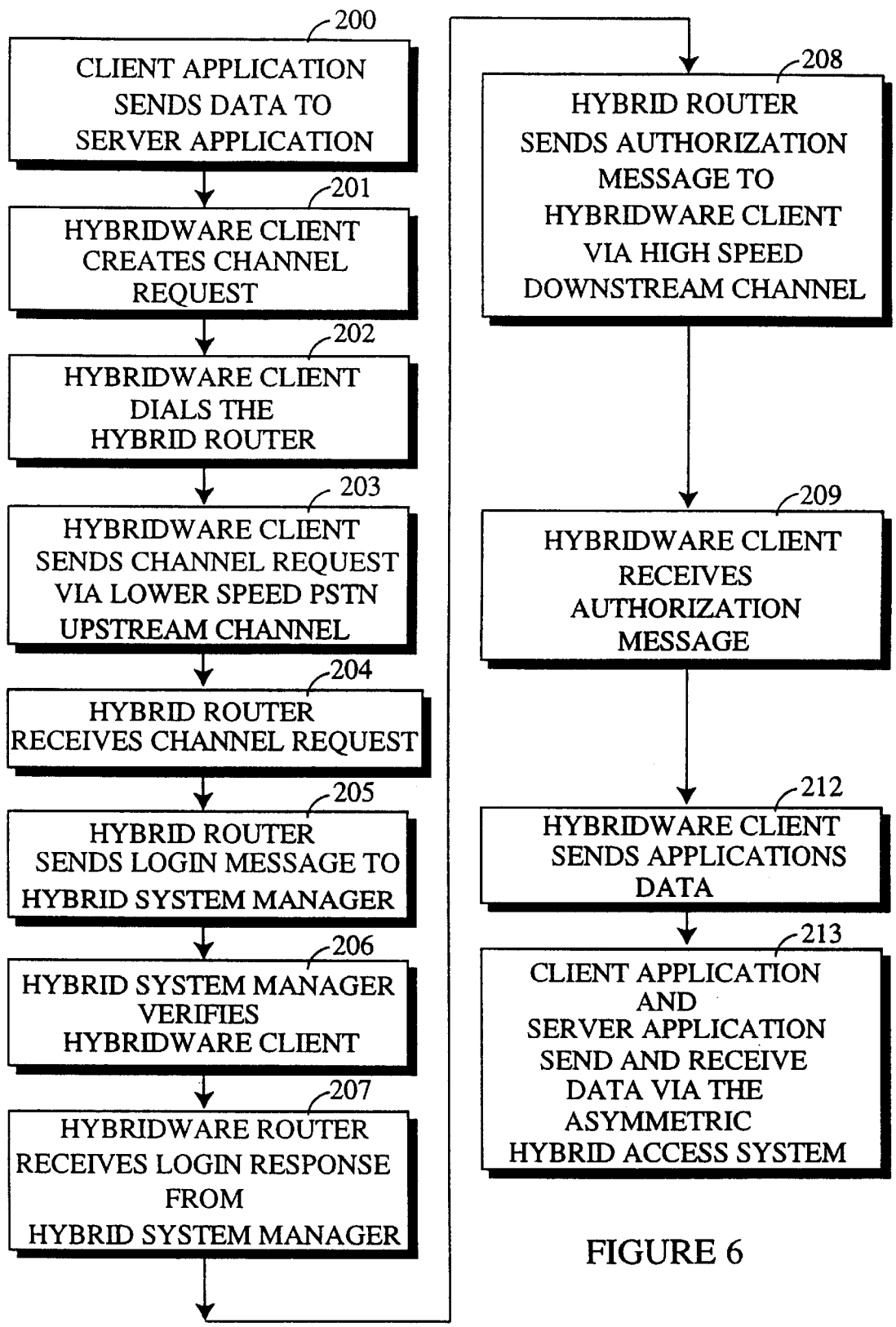
FIG. 6 is a flow chart of operation of a one-way cable network embodiment of the hybrid access system according to the present invention, including provision for upstream telephone system data flow.

FIG. 6 is a flow chart of operation of a one-way cable network embodiment of the hybrid access system 1 according to the present invention, including provision for upstream telephone system data flow. According to this embodiment of the present invention, when client application 74 needs to communicate with server application 70 in an upstream direction, Hybridware™ client 73 dials 202 Hybridware™ router 72. Then, Hybridware™ client 73 sends 203 a channel request via lower speed PSTN upstream channel (not shown). Hybridware™ router 72 receives 204 the channel request and sends 205 a login message to Hybridware™ system manager 71. Hybridware™ system manager 71 verifies 206 Hybridware™ client 73 as an authorized user. Then, Hybridware™ router 72 receives 207 a login response from Hybridware™ system manager 71. Hybridware™ router 72 sends 208 an authorization message to Hybridware™ client 73 via high speed downstream channel 76. Hybridware™ client 73 receives 209 the authorization message for use of a selected upstream PSTN channel. Finally, Hybridware™ client 73 sends 212 the selected application data. Accordingly, client application 74 and server application 70 are able to send and receive 213 selected data via the asymmetric hybrid access system 1.

Figure 7:
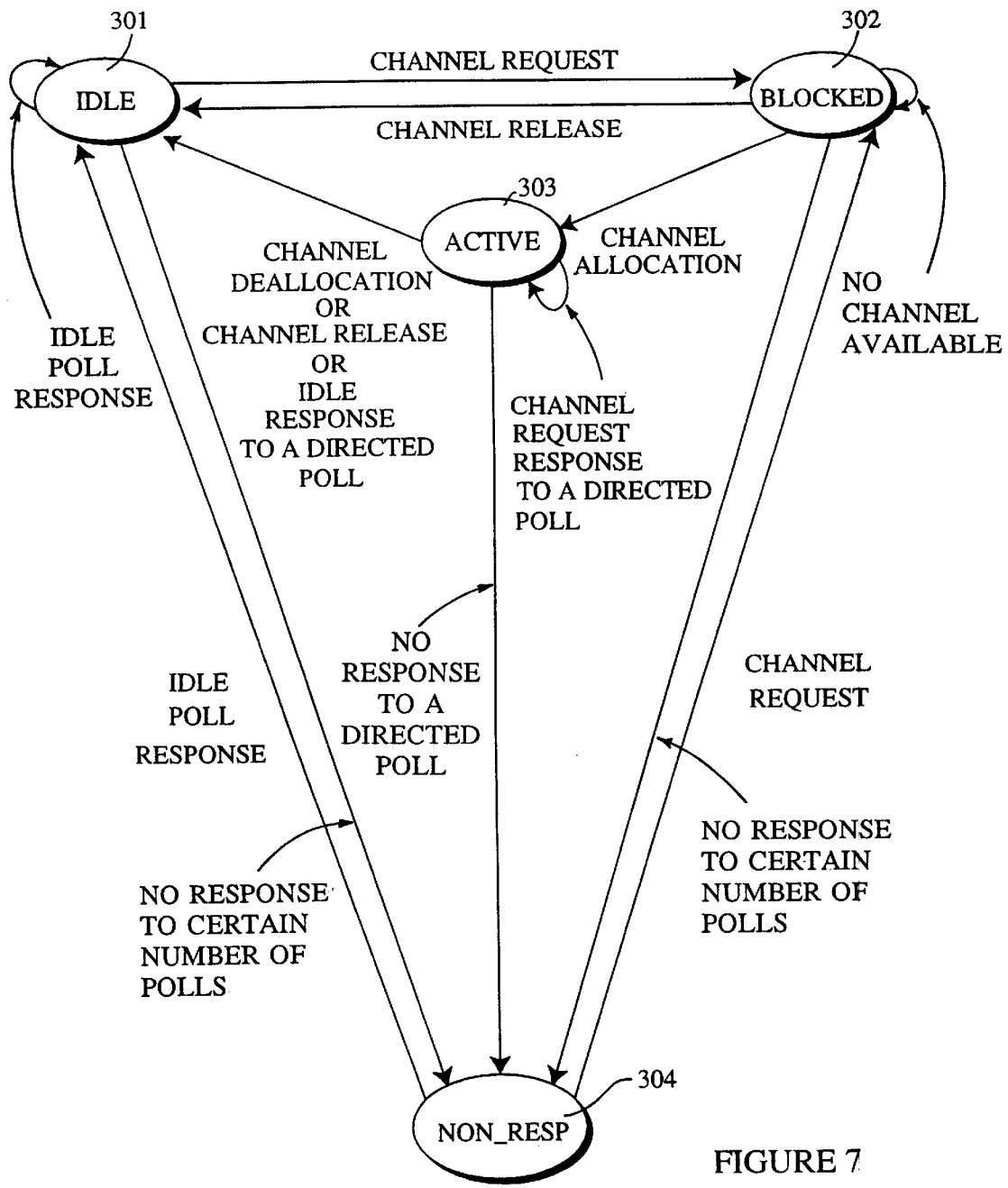
FIG. 7 is a Hybridware™ server state diagram of the upstream channel allocation method according to the present invention.

FIG. 7 is a Hybridware™ server state diagram for upstream channel allocation of the hybrid access system according to one embodiment of the present invention. According to the state diagram of FIG. 7, the Hybridware™ server can be in one of four states: IDLE 301, NON$_{13}$ RESP 304, BLOCKED 302, or ACTIVE 303. In the IDLE state, the Hybridware™ server expects an IDLE poll response, if there is no request to the client from the no application or a channel request message, or if there is application data that needs to be sent in the upstream direction, the state is idle. Upon receiving a channel request message from a client, the server transitions the client to a BLOCKED state. In a BLOCKED state, the server sends one of two messages to the client a channel allocation message or a no channel available message. Upon sending a channel allocation message, the server transitions the client to an ACTIVE state. Upon sending a no channel available message, the client remains in a BLOCKED state. The client will remain in the BLOCKED state until either a channel becomes available in which case the server will transition the client to the ACTIVE state or the server receives a channel release message in which case the server will transition the client to the IDLE state. In the ACTIVE state, the server does not poll the client. The server transitions the client from ACTIVE to IDLE upon receiving a channel deallocation message or upon detecting a system defined inactivity time-out. In the ACTIVE state, the server waits for a periodic heartbeat message from the client. The Hybridware™ server software awaits periodic heartbeat messages from the client at selected time intervals. The server software monitors other channel quality parameters including errors and signal to noise ratios. If the server stops hearing a certain number of operability indications or signals within a system defined interval as to a particular client, or if particular parameters (e.g., signal to noise ratio), then the server send a directed poll to the particular client. Essentially, the client is instructed to respond on another control frequency. If the client responds on the designated control frequency, the server reassigns the upstream channel to the client, so that it can continue to operate. If not, the client is deemed NON_RESP. Channel quality monitoring and channel reassignments are done transparently to the user and the applications. If a certain, system defined, consecutive count of heartbeat messages is missed, the server issues a special poll message or directed poll. If the client does not respond, the server transitions to the NON_RESP state. If the client responds to the poll, the server either remains in the ACTIVE state or transitions to the IDLE state. The former happens, if the client responds with a channel request message, and the latter happens, if the client responds with an IDLE poll response. In the former case, the server may decide to assign a different upstream channel to the client. In the BLOCKED or IDLE state, the server will transition the client to NON_RESP, i.e., "nonresponsive," state after the client fails to respond to a system defined number of polls. The NON_RESP state is almost identical in terms of state transition to idle state, a difference being that an IDLE poll response transitions the client into an IDLE state.

Figure 8:
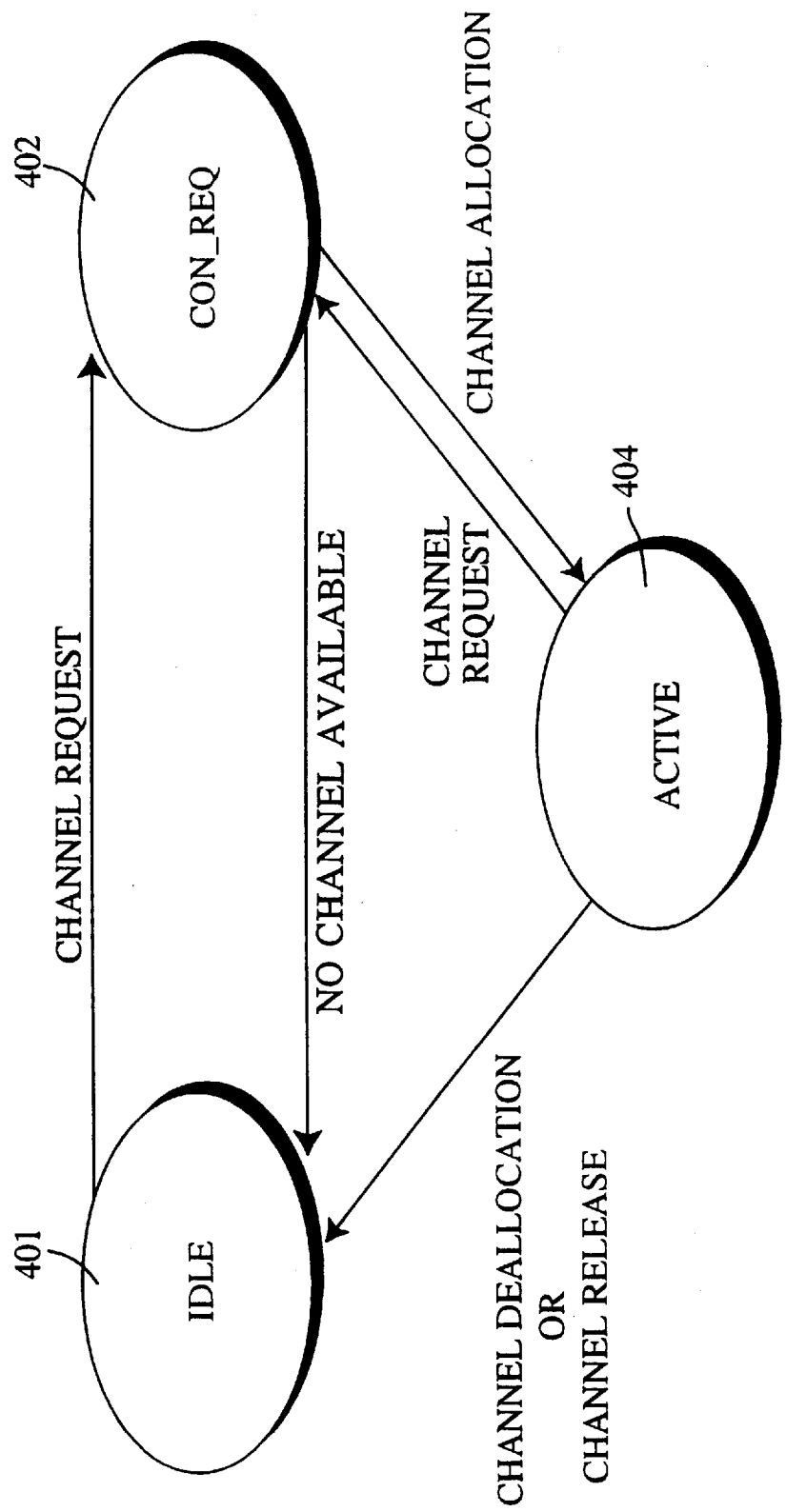
FIG. 8 is a Hybridware™ client state diagram of the upstream channel allocation method according to the present invention.

FIG. 8 is a Hybridware™ client state diagram for upstream channel allocation of the hybrid access system 1 according to an embodiment of the present invention, involving two way cable communication. According to this embodiment, the hybrid upstream client protocol has three states, IDLE 401, CON_REQ, i.e., "connect request" 402, and ACTIVE 404. In the IDLE state, the client, when polled, will transmit an IDLE poll response, if there is no request from the application. However, it will respond with a channel request message, if there is data that needs to be sent upstream. Upon transmitting a channel request message, the client transitions to a CON_REQ state. In the CON_REQ state, the client expects one of two messages from the hybrid router, a channel available or a no-channel allocation signal. Upon receiving a channel allocation message, the client informs the application and tunes to the channel it was allocated and transitions to the ACTIVE state. Upon receiving a no-channel available message, the client informs the application and transitions to the IDLE state. In the ACTIVE state, the client forwards data messages from the application to the upstream transmitter. In the ACTIVE state, the client further monitors the application activity and if it detects that no data has moved from the application to the upstream transmitter for a system defined period of time, it will send a channel deallocation request and transition to an idle state. In an ACTIVE state, the application may explicitly request that the channel be released, in which case the client will send a channel deallocation request to the hybrid router and will transition to the IDLE state. In the ACTIVE state, the client periodically sends an operability indication message to the server. If the client receives a poll message during the ACTIVE state, it will send a channel request message and will transition to a CON_REQ state. The hybrid router may also send an unsolicited channel release message, in which case the client will notify the application and transition from ACTIVE state to IDLE state.

Figure 9:
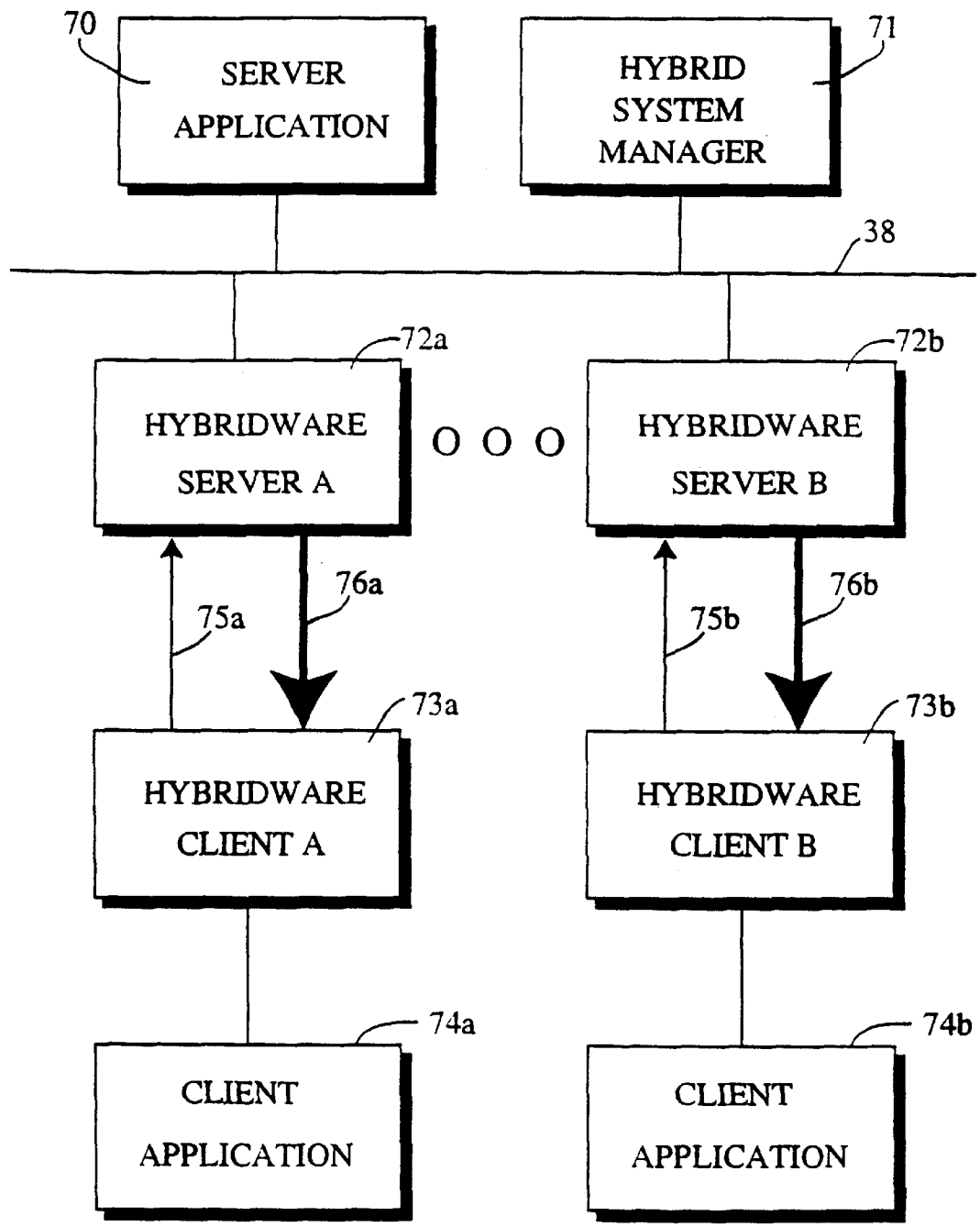
FIG. 9 is a logical data flow diagram showing data flows between router server and client computers of the hybrid access system for automatic handling of multiple clients according to automatic address allocation methods of the present invention.

FIG. 9 is a logical data flow diagram showing data flows between server and client computers of the hybrid access system 1 according to the present invention, for multiple clients under an address allocation protocol simplifying distribution of ip addresses to remote systems. The protocol according to the present invention determines where a given Hybridware™ client is located and how to download its ip address, given that the client has no address yet. Hybrid access system 1 includes a server application 70, a hybrid system manager 71, and Hybridware™ servers 72a & 72b connected to LAN 38. Hybrid access system 1 further includes Hybridware™ clients 73a and 73b and client applications 74a and 74b operating with respective ones of Hybridware™ clients 73a and 73b. Hybridware™ client 73a communicates with Hybridware™ server 72a, as transmitter along upstream channel 75a or as receiver along downstream channel 76a. Hybridware™ client 73b communicates with Hybridware™ server 72b, as transmitter along upstream channel 75b or as receiver along downstream channel 76b. Downstream data traffic is expected to be higher capacity than upstream data traffic: Hence, the bolder depiction of downstream channels 76a and 76b than upstream channels 75a and 75b.

Figure 10:
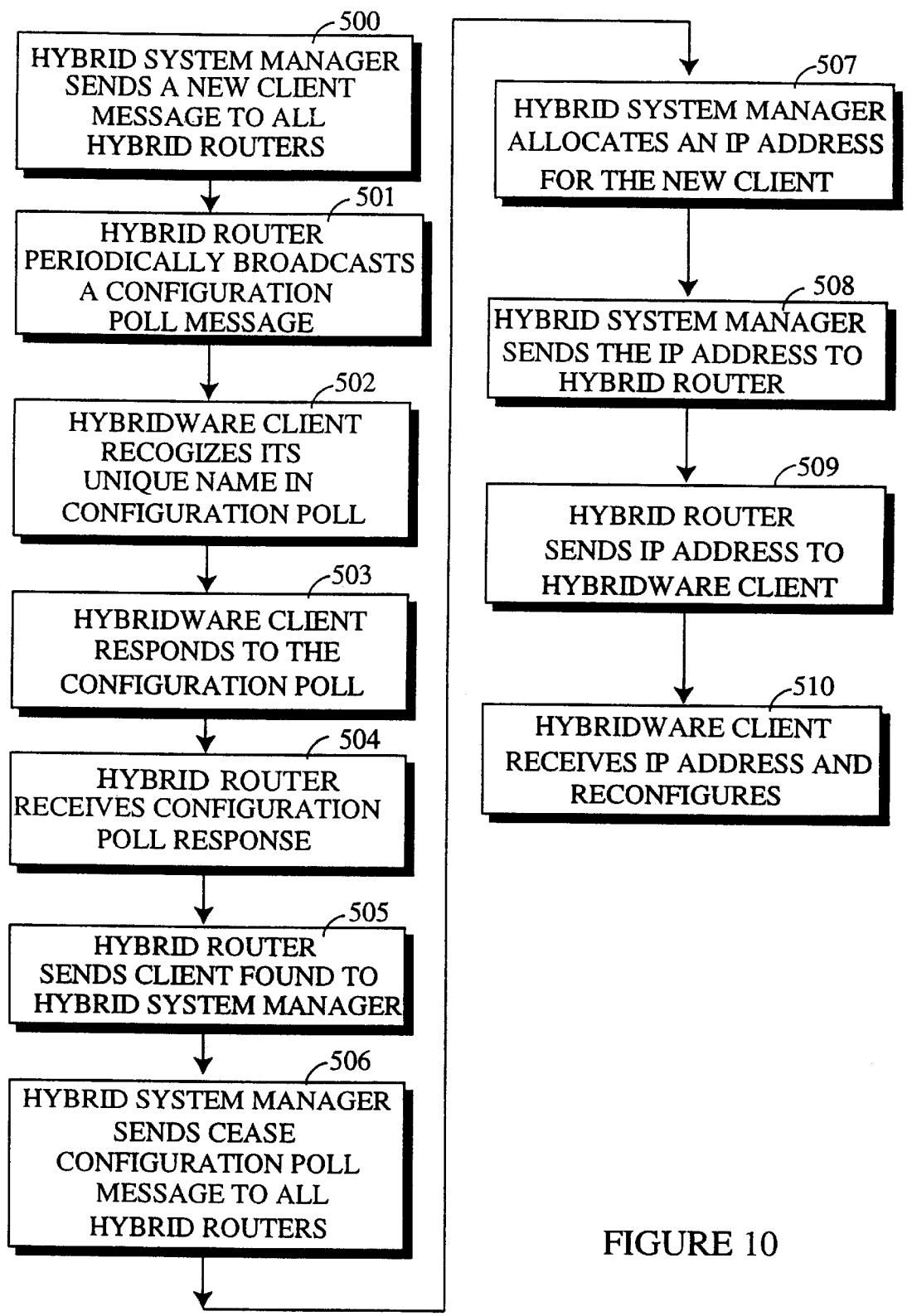
FIG. 10 is a flow chart of address allocation control protocol according to the present invention.

FIG. 10 is a flow chart of address allocation control according to an embodiment of the present invention to logon and configure Hybridware™ clients with a selected unique node name which is entered in the configuration database in the hybrid system manager 71 which is the software portion of network management system 37. In particular, hybrid system manager 71 sends a new client message to all hybrid routers 72a and 72b after learning of particular new clients by message, mail, or telephone call (Step 500 in FIG. 10). At this point the hybrid system manager is aware of a Hybridware™ client identification name and equipment serial number, but has not associated the client identification name with a separate unique client address (e.g., Internet Protocol, or IP address) provided by separate automatic registration. Each hybrid router 72a and 72b periodically broadcasts a configuration poll message (Step 501). Hybridware™ clients recognize their preselected unique names during a configuration poll. Hybridware™ clients 72a and 72b respond to the configuration poll (Step 502). Hybrid routers 72a and 72b receive respective configuration poll responses. Then, hybrid routers 72a and 72b send respective client found messages to system manager 71. System manager 71 then sends a cease configuration poll message to all hybrid routers. Further, system manager 71 allocates an Internet protocol (IP) address and other configuration data for each new client according to the preselected unique names. System manager 71 sends the IP address and other configuration data to the applicable hybrid router 72a, 72b. Then, the applicable hybrid router 72a, 72b sends using broadcast or unicast and the unique name the corresponding IP address and other configuration data to the applicable Hybridware™ client. As a result, the Hybridware™ client receives the IP address and other configuration data determined and reconfigures appropriately. In summary, according to the present invention, an automatic address allocation and configuration method in transmissions employs a hybrid access system. Remote users are identified initially with a unique abstract name, e.g., "Bob," and this abstract name is registered by the network management system. Configuration is established by the upstream routers polling the remote users and registering the location of the remote user responding to the poll made with the particular abstract name. Upstream channel allocation is accordingly made subject to the configuration made including abstract name and identified location. Automatic address allocation and configuration is accordingly accomplished on line at an initial log-on session with a new user. The method of the present invention is accordingly swift and simple, eliminating registration relays experienced by many known log-in systems.

Figure 11:
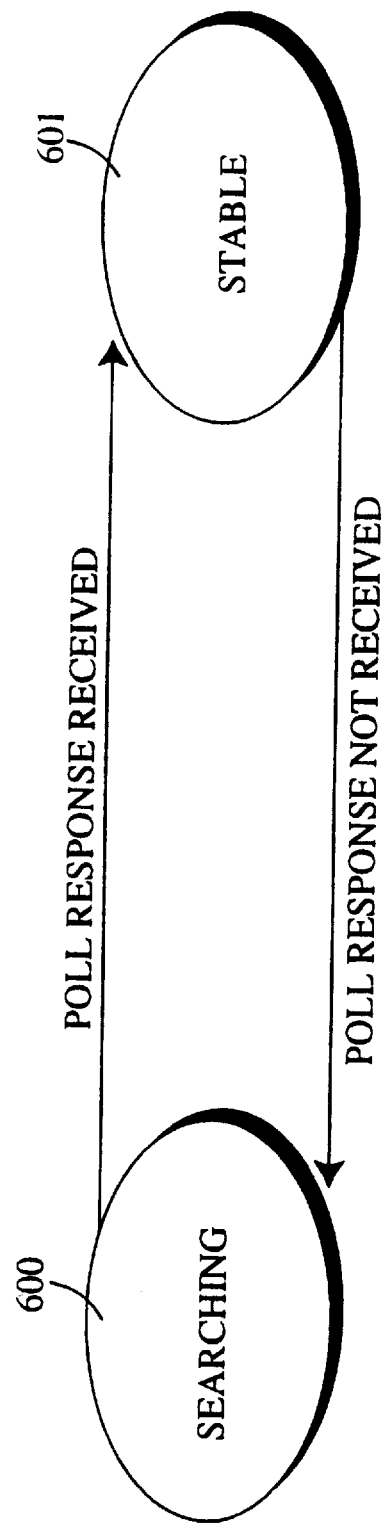
FIG. 11 is a state diagram of the hybrid adaptive gain control protocol according to the present invention.

FIG. 11 is a state diagram of the hybrid adaptive gain control protocol according to the present invention, which overcomes noise and attenuation while transmitting on cable in an upstream direction. The hybrid adaptive gain control protocol has a searching state 600 and a stable state 601. In stable state 601, the protocol evaluates poll messages from the hybrid router. If a poll message indicates loss of a poll response, the protocol transitions to the searching state 600. Poll responses are transmitted at a fixed power level. In the searching state 600, the client system responds to polls with a poll response at larger and larger power levels. After receiving a system specified, number of consecutive polls with an indication of a successful poll response, the system transitions to a stable state.

Figure 12A:
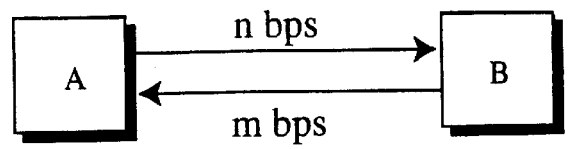
FIG. 12a is a transmission diagram of information exchange between two nodes in an asymmetric network according to the present invention, having a high downstream data rate of n bits per second and a lower upstream data rate of m bits per second.
Figure 12B:
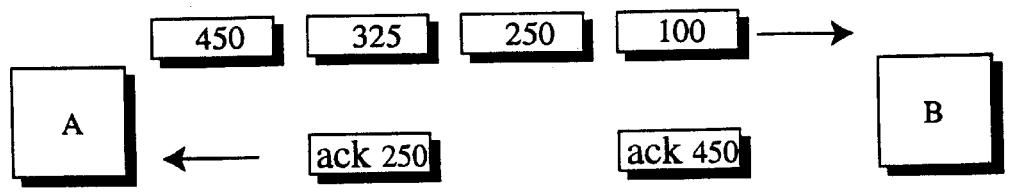
FIG. 12b is a diagram of conventional downstream messaging of first through fourth data packets, 100, 250, 325, and 450, between first and second nodes, in parallel with upstream transmission of receipt acknowledge indications.
Figure 12C:
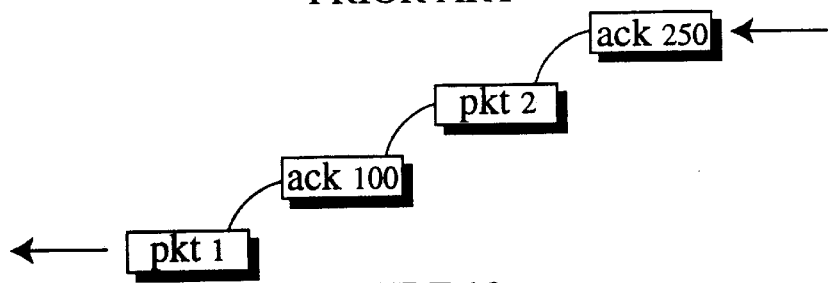
FIG. 12c is a diagram of a conventional transmission buffer queue in a RLA of a remote client station.
Figure 12D:
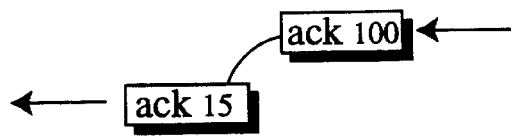
FIG. 12d is a diagram indicating a redundant acknowledgment packet in a conventional transmission buffer queue in a RLA of a remote client station.
Figure 12E:
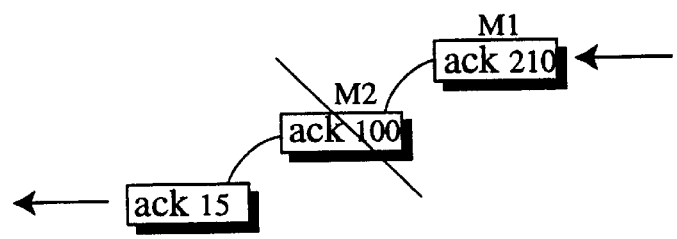
FIG. 12e is a diagram of a conventional transmission buffer queue, indicating no need for an earlier acknowledgment (ack 100) packet in view of a new acknowledgment (ack 210) packet that supersedes the earlier acknowledgment packet.
Figure 12F:
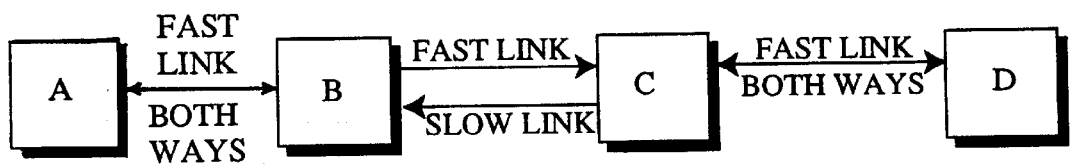
FIG. 12f is a diagram of first through third network nodes serially connected to each other in accordance with the present invention, wherein the link between the first and second nodes is asymmetric and that between the second and third nodes is symmetric.

FIG. 12a is a transmission diagram of information exchange between nodes A and B. Nodes A and B comprise an asymmetric network according to the present invention, having a high downstream data rate of n bits per second and a lower upstream data rate of m bits per second. The downstream data rate n is greater than the upstream data rate m. Node B includes receive and transmission queues to hold information received and to be sent, including acknowledge indications or messages. The acknowledge suppression method according to the present invention relates to the node or system transmitting data acknowledgments, which acknowledges receipt of either data packets or data bytes contained in incoming packets. The numbers on data packets indicate the position of the last data byte of the packet in the data stream, and the acknowledgment numbers indicate that all the bytes of the data stream up to and including the byte indicated have been received. According to the method of the present invention, the acknowledgment of byte k (or packet number k) indicates that all bytes or packets prior to k have been received. According to a method of the present invention, the transmit queue queues up additional acknowledgment packets as new packets are received. FIG. 12b is a diagram of messaging of first through fourth data packets, 100, 250, 325, and 450, between upstream and downstream nodes, in parallel with upstream transmission of receipt acknowledge indications with respect to only two data packets, namely 250 and 450. FIG. 12c is a diagram indicating acknowledgment of first and second packet receptions during a first time period. In particular, packet 1 (i.e., "pkt 1") is currently being sent, and an acknowledge (i.e., "ack 250") message is currently being appended at the end of the transmit queue. FIG. 12d is a diagram indicating acknowledgment of another packet during another period. FIG. 12e is a diagram indicating no need for an acknowledge 100 signal in view of a prior acknowledgment having been successful. In particular, according to the acknowledge suppression method of the present invention, not all acknowledgment packets will be sent to node A, because the "ack 210" message carries information which supersedes the "ack 100" message. Accordingly, the amount of traffic on the communication link from B to A is reduced, according to the present invention. In general, this introduces an acknowledge latency, but where all messages queued up for transmission are acknowledgments, acknowledgment latency is reduced. For example, when an "ack 15" signal is transmitted and an "ack 100" message awaits transmission, and an "ack 210" message is appended to the queue, the acknowledge suppression method according to the present invention will delete the "ack 100" message as superfluous. Any new acknowledgments appended while "ack 15" is being transmitted will result in deletions of unnecessary acknowledgments keeping queue length to two. Upon transmit completion of "ack 15," the next acknowledgment, e.g., "ack 210" will be transmitted. Accordingly, the method of the present invention eliminates unnecessary transmission of "ack 100" signals and provides for reduced acknowledgment latency for "ack 210." The ack suppression method according to the present invention, accordingly reduces the probability of queue overflow and potential out of memory conditions in system B. It reduces the load on the communication link from B to A, and in some circumstances reduces acknowledgment latency for data transfers from B to A. FIG. 12f is a diagram of first through fourth network nodes serially connected to each other in accordance with the present invention, wherein the link between the first and second nodes is symmetric, the link between the second and third nodes is asymmetric and that between the third and fourth nodes is symmetric. The acknowledge suppression method of the present invention applies to both the communications system of FIG. 12a, in which nodes A and B are end nodes, as well as to the communications system of FIG. 12f, in which nodes B and C are intermediate systems such as a router, and data packets originating at node D are transmitted through router nodes C and B to a central system connected to node A.

Figure 13:
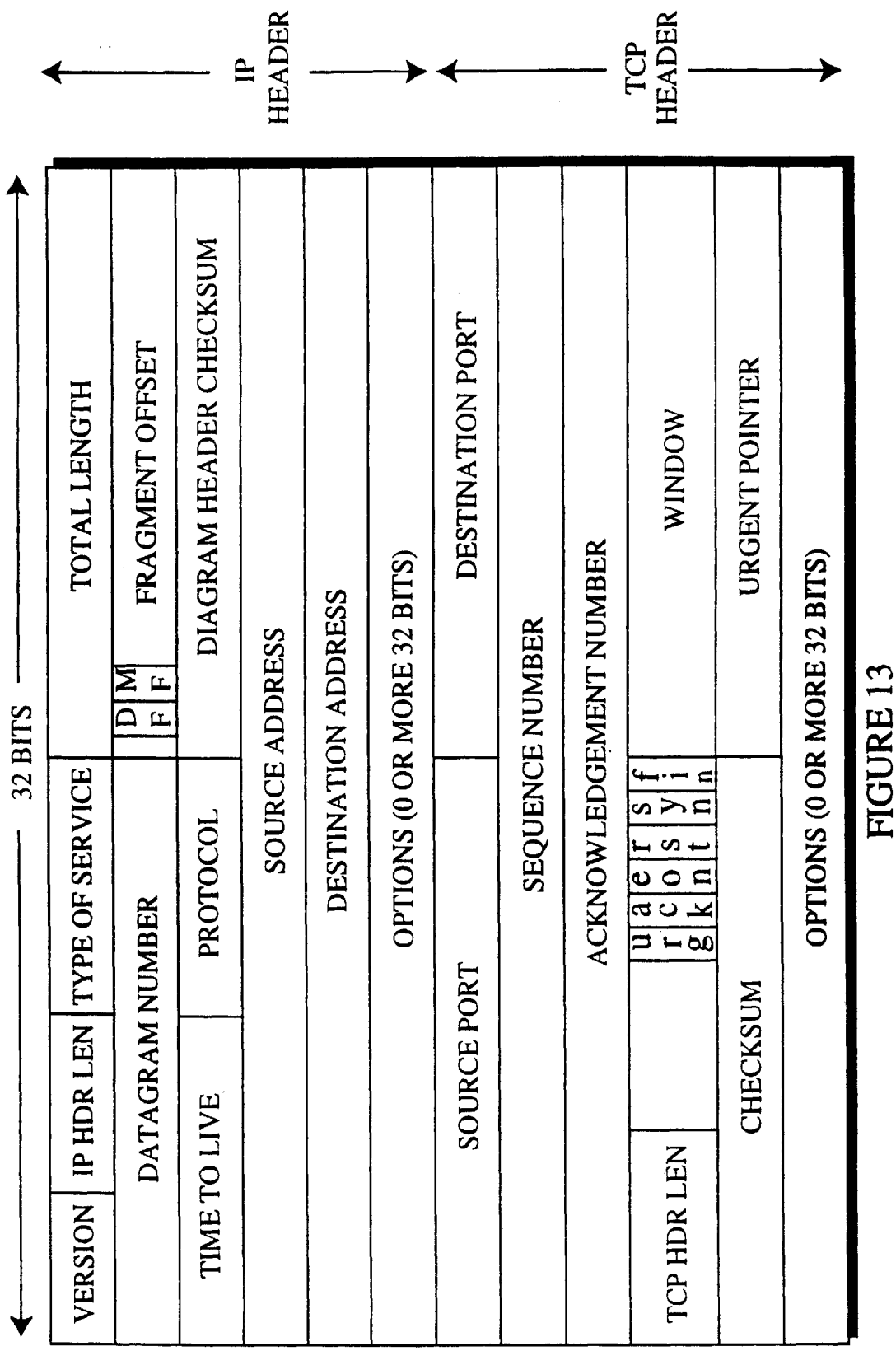
FIG. 13 is a tabular description of transmission control protocol/Internet protocol (TCP/IP) data transmission packet protocol header as used in connection with the present invention.

FIG. 13 is a tabular description of a transmission control protocol/Internet protocol (TCP/IP) data transmission packet protocol header as used in connection with the present invention. The first five 32 bit words and the following IP options are referred to as the IP header. The five words following the IP options together with the words containing TCP options are referred to as the TCP header. The non-ack TCP header is the TCP header less the acknowledgment number field.

FIG. 14a shows sequential data transmission between first and second nodes, according to the present invention. As shown in FIG. 14a, data packets or bytes 100–700 are transmitted from node A to node B. Concomitantly, acknowledge messages, "ack 100," "ack 200," and "ack 300," were dispatched from node B to node A.

FIG. 14b shows a data packet sequence of packets 100–400 held in the transmit queue during a first time period, followed by a single acknowledgment, "ack 100."

FIG. 14c is a diagram of a data packet sequence transmitted during a later time period, eliminating retransmission of the 300 packet, because another 300 packet was already in the transmission buffer.

Figure 15:
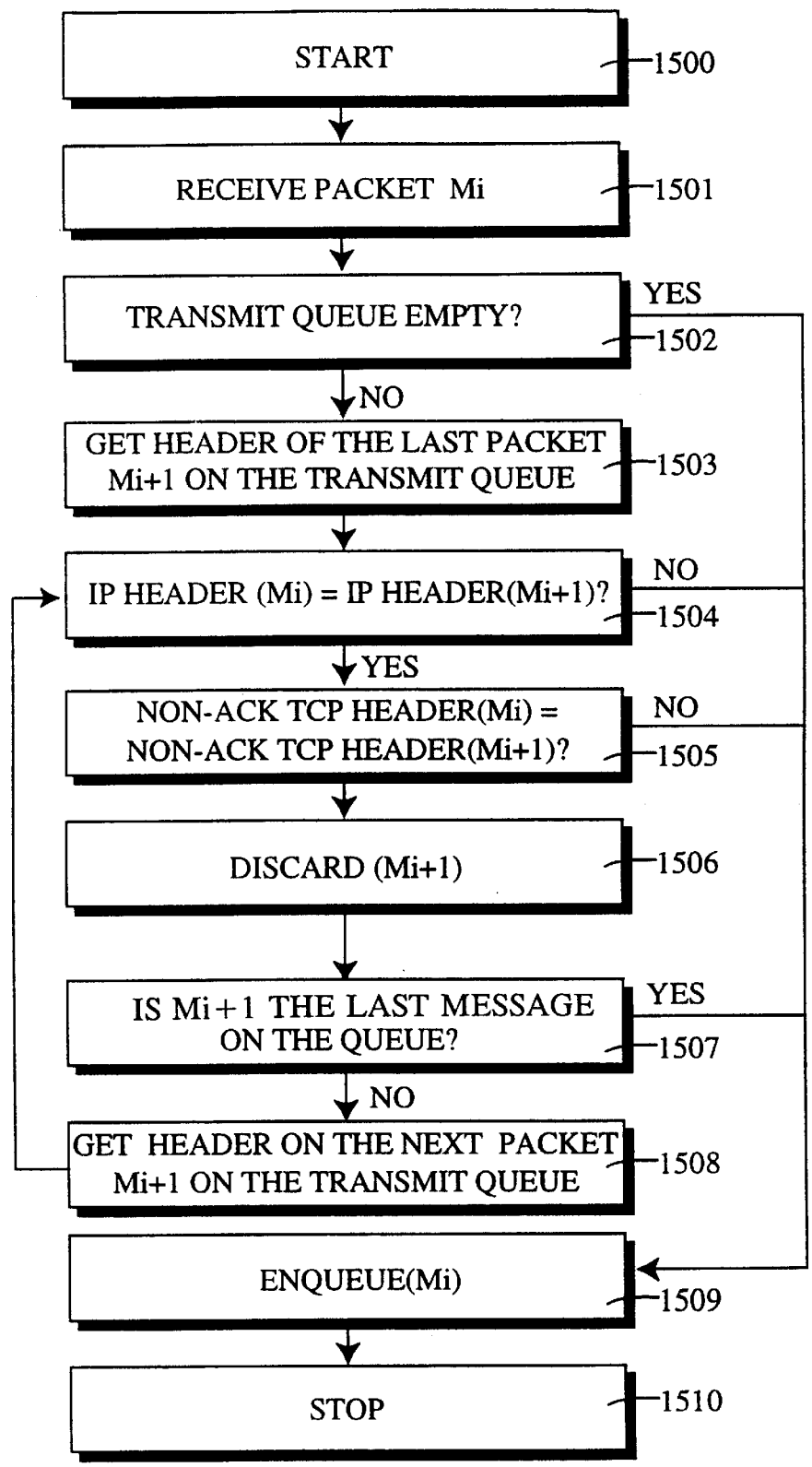
FIG. 15 is a flow diagram of the acknowledge suppression method according to the present invention.

FIG. 15 is a flow diagram of an acknowledge suppression (AS) method, i.e., an AS method, according to the present invention in which receipt of information transmitted from system A to system B over a first independent simplex communication link is acknowledged by system B. The method of the present invention starts 1500 at a particular time, and a first packet Mi of information is received 1501. If the transmit queue is not empty 1502, the header of the last packet Mi+1 on the transmit queue is obtained 1503. If the transmit queue is empty 1502, then Mi is enqueued 1509 and the AS method according to the present invention is completed. If the header of the last packet Mi+1 on the transmit queue equals 1504 the header of packet Mi, and the NON_ACK TCP header of Mi equals 1505 the NON_ACK TCP header of Mi, then Mi+1 is discarded 1506. If the header of the last packet Mi+1 on the transmit queue does not equal 1504 the header of packet Mi, or the NON_ACK TCP header of Mi does not equal 1505 the NON_ACK TCP header of Mi, then Mi is enqueued 1509 and the AS method according to the present invention is completed. If Mi+1 is not the last message on the queue 1507, then the header on the next packet Mi+1 on the transmit queue is obtained 1508, and a comparison is done to determine whether the header of the last packet Mi+1 on the transmit queue equals 1504 the header of packet Mi. If Mi+1 is the last message on the queue 1507, then Mi is enqueued 1509 and the AS method according to the present invention is completed.

Figure 16:
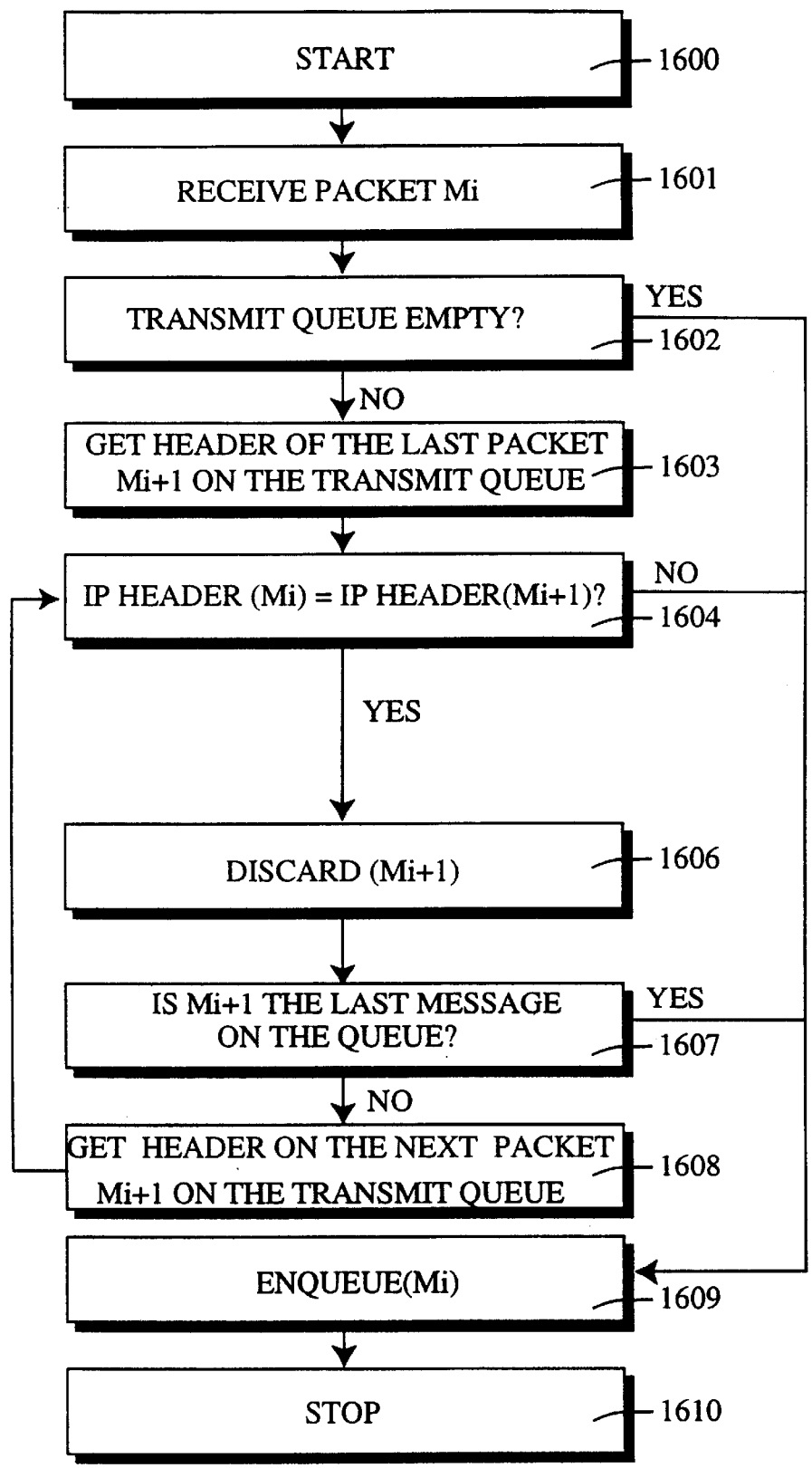
FIG. 16 is a flow diagram of the packet suppression method according to the present invention.

FIG. 16 is a flow diagram of the packet suppression (PS) method according to the present invention. The method of the present invention starts 1600 at a particular time, and a first packet Mi of information is received 1601. If the transmit queue is not empty 1602, the header of the last packet Mi+1 on the transmit queue is obtained 1603. If the transmit queue is empty 1602, then Mi is enqueued 1609 and the PS method according to the present invention is completed. If the header of the last packet Mi+1 on the transmit queue equals 1604 the header of packet Mi, then Mi+l is discarded 1606. If the header of the last packet Mi+1 on the transmit queue does not equal 1604 the header of packet Mi, then Mi is enqueued 1609 and the PS method according to the present invention is completed. If Mi+1 is not the last message on the queue 1607, then the header on the next packet Mi+1 on the transmit queue is obtained 1608, and a comparison is done to determine whether the header of the last packet Mi+1 on the transmit queue equals 1604 the header of packet Mi. If Mi+1 is the last message on the queue 1607, then Mi is enqueued 1609 and the PS method according to the present invention is completed.

Figure 17:
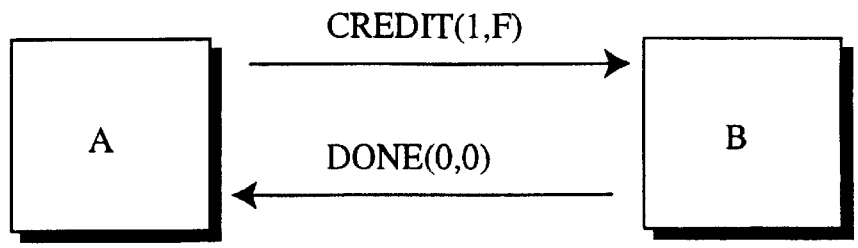
FIG. 17 is a flow diagram of information exchanges between Hybridware™ server and client, under conditions in which the client has no information to transmit.

FIG. 17 is a flow diagram of information exchanges between Hybridware™ server and client, according to conditions in which the client has no data to transmit. A credit (1, F) corresponding to a predetermined amount of data, e.g., ten bytes, or ten packets, is transmitted from node A to node B, and a done signal DONE(0,0) is transmitted from node B to node A, indicating that no data packet was transmitted, leaving the existing credit level of the particular channel unchanged. The credit protocol according to the present invention permits single upstream cable channels to be shared by multiple remote link adapters. Alternatively, a single upstream channel is controlled and used by a single remote link adapter until the channel is relinquished. The present invention includes an allocation method in transmissions employing a hybrid access system. According to a method of the present invention, an upstream channel is shared by a plurality of remote link adapters in accordance with a credit criterion, and credit control packets are dispatched to a remote link adapter which permit the remote link adapter to send data packets to arbitrary hosts. Upon sending a data packet, the remote link adapter returns the credit control packet to a Hybridware™ server. A credit permits a remote link adapter to send a certain number of packets up to a maximum number controlled by a configuration parameter MAX_CREDIT_PACKETS, thereby eliminating polling for that period. If a remote link adapter does not have a data packet to send, it returns the credit to the hybrid access system without sending any data packets. The remote link adapter then sets a field in the credit control packet to the number of packets which was sent. If the protocol process at the server does not receive credit status information from the credit control packet within a certain credit time-out, CREDIT_TIMEOUT, in milliseconds, for a certain number of times, FAIL_CNT, consecutively, the remote link adapter is assumed to be in error and is put in a not-responding state. The overall upstream channel performance of a remote link adapter using a credit channel is lower than a remote link adapter on a sole use upstream channel. If any sole use upstream channel becomes available, this channel is given to the credit remote link adapter that has been waiting the longest for a sole use upstream channel that currently has packets to send.

Figure 18:
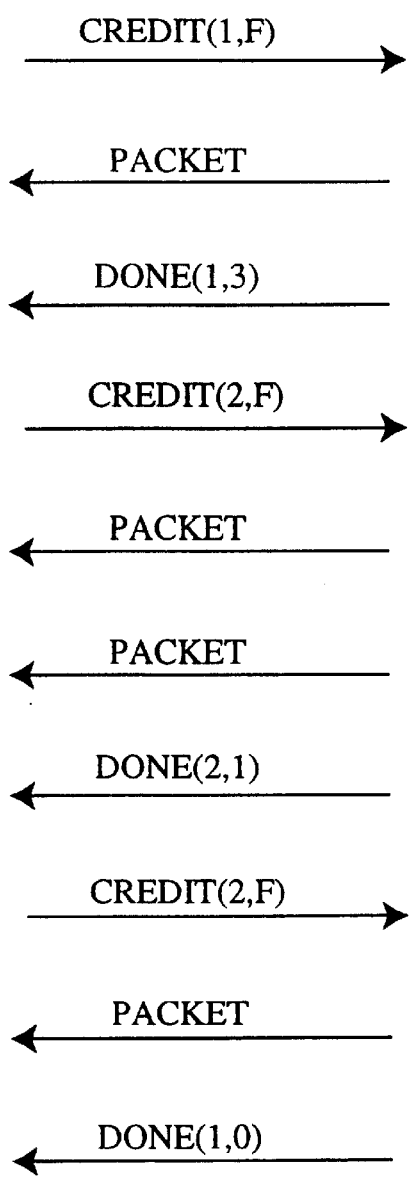
FIG. 18 is a flow diagram of information exchanges between Hybridware™ server and client, under conditions in which the client has information to transmit and the server gradually allocates bandwidth to the client.

FIG. 18 is a flow diagram of information exchanges between Hybridware™ server and client, according to conditions in which the client has information to transmit and the server gradually allocates bandwidth to the client. In particular, a node first provides a single credit at a selected frequency. Then a packet is sent, consuming the credit, followed by a completion message indicating use of one credit and potential for an additional transmission corresponding to three credits. Next, a credit is provided corresponding to two packets at the selected frequency, which is followed by two packet transmissions and a completion message indicating consumption of two credits and potential for transmission of one more. In response, another double credit is sent, followed by a single packet and an acknowledgment of transmission of one and potential for no more transmissions.

Figure 19:
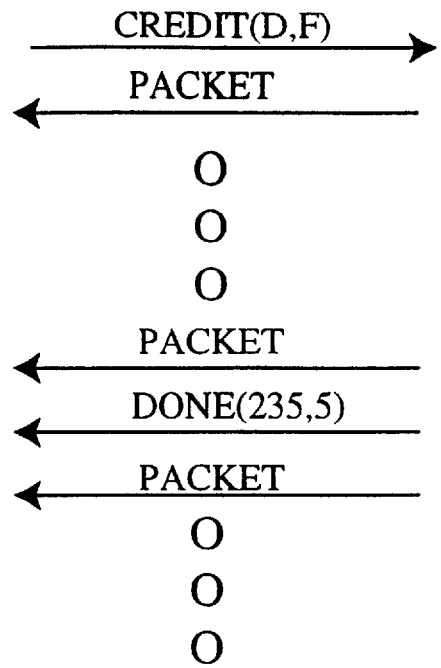
FIG. 19 is a flow diagram of information exchanges between Hybridware™ server and client, under conditions in which the server allocates the client a dedicated channel, the client transmits data and periodically reports to the server with done messages.

FIG. 19 is a flow diagram of information exchanges between Hybridware™ server and client, according to conditions in which the server allocates the client a dedicated channel, the client transmits data and periodically reports to the server with done messages. In particular, a credit indication dedicating a channel at frequency F is provided, followed by 235 packet transmissions. According to prearrangement, of operability indication in the form of a DONE message is provided at an established time indicating potential for five more packet transmissions. The done message indicates completion of 235 packet transmissions, as an accounting function. Because the channel is dedicated, further packet transmissions are made without specific further credit allocations.

Figure 20:
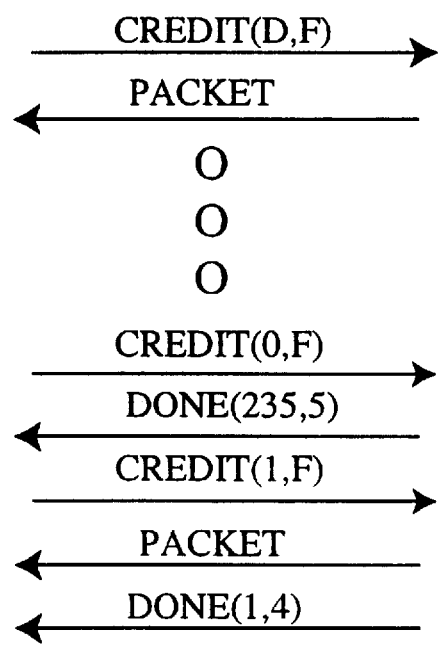
FIG. 20 is a flow diagram of information exchanges between Hybridware™ server and client, under conditions in which a dedicated channel is converted into a shared channel.

FIG. 20 is a flow diagram of information exchanges between Hybridware™ server and client, according to conditions in which a dedicated channel is converted into a shared channel. In particular, a credit indication is provided, followed by transmission of 235 packets and a credit message stopping channel dedication and switching to a credit mode. Responsive to the credit message a DONE signal accounts for the 235 packets transmitted during the dedicated mode and indicates potential for five more transmissions. This is followed by a credit allocation of one at a selected frequency. Thus, one packet is transmitted, followed by a completion indication specifying potential for four more packets to be transmitted.

What is claimed is:

1. A method of accessing a wide area network from any of a plurality of client processors each in communication with an asymmetric hybrid network including high-speed downstream and lower-speed upstream channels, said method including the steps of:

providing a shared medium over which said plurality of client processors receive information transfers via said downstream channel, providing two-way control of said high-speed downstream and lower-speed upstream channels in a network session by a hybrid system manager and a router server, providing a polling signal from said hybrid system manager to poll said client processors over said high-speed downstream channel, issuing an upstream channel allocation request via a lower speed channel, conducting login communications between said router server and the system manager, verifying authorized user status at the system manager, allocating an upstream channel to at least one of said client processors by a message sent via said high speed downstream channel, and sending upstream data over the allocated lower speed upstream channel of the asymmetric hybrid access network.

2. The method according to claim 1, further including the step of providing multiple states of operation of said client processors, and wherein the step of providing a polling signal includes polling representations of said client processors assigned to an idle state at a selected period of polling.

3. The method according to claim 1, further including the step of providing multiple states of operation of said client processors, and wherein the step of providing a polling signal includes polling representations of said client processors assigned to a blocked state at a selected periodicity of polling.

4. The method according to claim 1, further including the step of providing multiple states of operation of said client processors, and wherein the step of providing a polling signal includes polling representations of said client processors assigned to a non-responsive state at a selected periodicity of polling.

5. The method according to claim 1, further including the step of providing multiple states of operation of said client processors including an idle state and a blocked state, and wherein the step of providing a polling signal includes polling representations of said client processors assigned to idle and blocked states at selected first and second periods of polling, and polling of client processors assigned to an idle state occurs more frequently than polling of client processors assigned to a blocked state.

6. The method according to claim 1, further including the step of providing multiple states of operation of said client processors including an idle state and a non-responsive state, and wherein the step of providing a polling signal includes polling representations of said client processors assigned to idle and non-responsive states at selected first and second levels of frequency of polling, and polling of client processors assigned to an idle state occurs more frequently than polling of client processors assigned to a non-responsive state.

7. The method according to claim 1, further including the step of providing multiple states of operation of said client processors including an idle state, a blocked state and a non-responsive state, and wherein clients in an idle state are polled multiple times during a poll cycle and polling of clients in a blocked or nonresponsive state is distributed evenly over a poll cycle to assure that the latency for acquiring a channel for idle units is uniform.

8. The method according to claim 1, wherein polling includes grouping clients by state and polling within each group on a round robin basis.

9. An asymmetric network communication system in which a representation of a remote client is polled at a selectable periodicity depending upon a state of said client, said system comprising a host server for communicating with said remote client over a shared medium and wherein said remote client includes an associated remote link adapter for receiving high speed downstream information from said host server over said shared medium and for transmitting lower speed return information over an upstream channel, and wherein said network communication system includes a hybrid access system for providing interactive network sessions in downstream and upstream communication channels, for assigning one of a plurality of states to said remote client and for polling said remote client at a selected one of multiple polling periods depending upon the assigned state of said remote client.

10. The system as in claim 9, wherein said plurality of states comprises at least two states selected from the group of states including active, idle, blocked and non-responsive states.

11. The system as in claim 10, wherein said client is assigned said idle state if said server has not received a channel request message from said client.

12. The system as in claim 11, wherein said client is transitioned from said idle state to said blocked state upon receipt by said server of said channel request message from said client.

13. The system as in claim 12, wherein said client is transitioned to said active state from said blocked state upon a channel becoming available and said server sending a channel allocation message to said client.

14. The system as in claim 12, wherein said client remains assigned to said blocked state when no channel is available and said server sends a no channel available message.

15. The system as in claim 12, wherein said client is transitioned to said idle state from said blocked state upon receipt by said server of a channel release message from said client.

16. The system as in claim 13, wherein said client is transitioned from said active state to said idle state upon said server receiving a channel deallocation message or detecting a predetermined inactivity time-out.

17. The system as in claim 13, wherein said client assigned to said active state provides said server with periodic messages.

18. The system as in claim 17, wherein said server sends a directed poll to said client if said server has not received signals from said client for a predetermined time period.

19. The system as in claim 18, wherein said directed poll instructs said client to utilize another upstream channel.

20. The system as in claim 18, wherein said server assigns said another upstream channel to said client if said client responds to said directed poll.

21. The system as in claim 18, wherein said client is transitioned to said non-responsive state if said client does not respond to said directed poll.

22. The system as in claim 18, wherein said client remains assigned to said active state if said client responds to said directed poll with a channel request message.

23. The system as in claim 18, wherein said client is transitioned to said idle state if said client responds to said directed poll with an idle poll response.

24. The system as in claim 12, wherein a client in said blocked or idle state is transitioned to a non-responsive state if said client fails to respond to a predetermined number of polls.

25. The system as in claim 12, wherein a client assigned to said non-responsive state is transitioned to said blocked state upon receipt by said server of a channel request message from said client.

26. The system as in claim 12, wherein a client assigned to said non-responsive state is transitioned to said idle state upon receipt by said server of an idle poll response.

27. The system as in claim 12, further including a plurality of remote clients that are assigned different states including an idle state, and wherein said remote clients assigned to said idle state are polled more frequently than all other clients.

28. The system as in claim 27, wherein clients assigned to said idle state are polled a plurality of times during each polling cycle.

29. A high speed communication system including a plurality of remote clients wherein status indications of states of respective ones of said clients are polled at a selected frequency depending on the respective states of said clients, said system comprising a shared medium, a host server for communicating with said plurality of remote clients over said shared medium and a hybrid access system for managing downstream and upstream communications between said host server and said plurality of clients, for assigning one of a plurality of states to respective ones of said remote clients and for polling representations of states of remote clients in a group in which clients have a common state at a selected one of multiple polling periods depending on the assigned state of said clients within said group.

30. The system as in claim 29, wherein said plurality of states comprises at least two states selected from the group of states including active, idle, blocked and non-responsive states.

31. The system as in claim 30, wherein a client in said active or idle state transitions to a connection request state when one of said clients transmitting a channel request message.

32. The system as in claim 30, wherein a client in said connection request state transitions to said idle state upon receipt of a no-channel allocation signal from said server.

33. The system as in claim 30, wherein a client in said connection request state transitions to said active state upon receipt of a channel allocation signal, said client also tuning to an allocated channel.

34. The system as in claim 30, wherein a client in said active state sends a channel deallocation request signal if it detects no activity from a client application for a predetermined time period, said client then transitioning to said idle state.

35. The system as in claim 30, wherein a client in an active state transitions to said idle state upon a request to transition to said idle state by a client application.

36. The system as in claim 30, wherein said server sends an unsolicited channel release message and cause a client to change from said active to said idle state.

37. A method of polling representations indicative of states of a plurality of remote devices in an asymmetric communication network including a server that communicates with said devices over a shared medium, comprising the steps of:

said server assigning a respective state of a plurality of states to respective ones of said plurality of remote devices;

said server polling said devices at different selectable periods based upon the respective states of said devices, and said server enabling an information transfer from one of said devices to said server as a result of said polling.

38. The method as in claim 37, wherein said plurality of states comprises at least two states selected from the group of states including active, idle, blocked and non-responsive states.

39. The method as in claim 38, wherein said server polls representations of devices that are assigned to said idle state more frequently than other devices.

40. An asymmetric network communication system including a server, a plurality of remote clients and an information distribution facility for distributing data to said remote clients, said communication system comprising:

a downstream channel that is shared by said plurality of remote clients to receive high speed data from said server over a shared medium, at least one upstream channel that enables at least one of said remote clients to transmit lower speed return data to said server, and a hybrid access system including a network manager for effecting transfers of data between said server and said remote clients, for effecting the assignment of one of a plurality of states to respective ones of said remote clients, for effecting polling of states of remote clients within a group having a common state at a selected one of multiple polling periods depending upon the state of remote clients in said group and for enabling transfers of data from said remote clients as a result of said polling.

41. The network communication system as recited in claim 40 wherein one of said upstream channels and said downstream channel reside in different communication media.

42. The network communication system as recited in claim 40 wherein said shared medium comprises a hybrid fiber coaxial cable system and said remote clients physically connect in parallel to said hybrid fiber coaxial cable system to receive simultaneously broadcasted data whereby to facilitate efficient sharing of resources at said distribution facility by said remote clients.

43. The network communication system as recited in claim 42 wherein one of said upstream channels comprises a PSTN network that routes data transmitted by said at least one remote client to said information distribution facility which, in turn, routes said data to said server.

44. The network communication system as recited in claim 43 wherein one of said upstream channels comprises a PSTN network that routes data transmitted by said at least one remote client directly to said server.

45. The network communication system as recited in claim 42 wherein one of said upstream channels comprises an independent lower speed channel transmitted over said hybrid fiber coaxial cable, and said upstream router receives said data transmitted by said at least one remote client over said independent upstream channel and routes said data to said server.

46. The network communication system as recited in claim 40 wherein said distribution facility comprises a cellular broadcast facility, said shared medium comprises radio frequency broadcasts from said cellular broadcast facility, and said remote clients each comprise radio frequency receivers for substantially simultaneously receiving data transmitted over said shared medium so as to provide sharing of resources at said distribution facility by said remote clients.

47. The network communication system as recited in claim 46 wherein one of said upstream channels comprises a lower speed cellular return channel routed through said distribution facility.

48. The network communication system as recited in claim 40 wherein said distribution facility comprises a direct broadcast satellite, said shared medium comprises electromagnetic transmissions from said direct satellite broadcast and said remote clients include a receiver for substantially simultaneously receiving data from said broadcast so as to provide sharing of resources among said remote clients.

49. The network communication system as recited in claim 48 wherein one of said upstream channels comprises a PSTN network that routes data transmitted by said remote clients directly to said server.

50. The network communication system as recited in claim 40 wherein each of said upstream and downstream channels resides in a communication medium selected from one of a transmission of a CATV distribution network, a cell site, a radio transmitter station, a television transmitter station, a hybrid fiber coaxial cable network, an over-the-air wireless network, a direct broadcast satellite communication network and a telephone network.

51. The network communication system as recited in claim 40 wherein said distribution facility comprises a television broadcast facility, said shared medium comprises radio frequency broadcasts from said television broadcast facility, and said remote clients include radio frequency receivers for substantially simultaneously receiving data transmitted over said shared medium whereby to provide sharing of resources located at said distribution facility.

52. The network communication system as recited in claim 51 wherein one of said upstream channels comprises a PSTN network that routes data transmitted by said remote clients to said information distribution facility which, in turn, routes said data to said server.

53. The network communication system as recited in claim 52 wherein one of said upstream channels comprises a PSTN network that routes data transmitted by said remote clients directly to said server.

54. The network communication system as recited in claim 40 wherein said distribution facility comprises a broadband broadcast facility, said shared medium comprises electromagnetic broadcasts from said broadband broadcast facility, and said remote clients include receivers for substantially simultaneously receiving data transmitted over said shared medium whereby to provide sharing of resources located at said distribution facility.

55. The network communication system as recited in claim 54 wherein one of said upstream channels comprises a PSTN network that routes data transmitted by said at least one remote client to said information distribution facility which, in turn, routes said data to said server.

56. The network communication system as recited in claim 54 wherein one of said upstream channels comprises a PSTN network that routes data transmitted by said at least one remote client directly to said server.

57. The network communication system as recited in claim 43 wherein said upstream channel protocol enables operation of said upstream channel at multiple speeds and said hybrid access system selectably controls speed of data transfers on said upstream channel so as to provide more effective utilization of channel bandwidth according to demand by respective ones of said remote clients communicating with said shared medium.

58. The network communication system as recited in claim 40 wherein said upstream channel protocol enables operation of said upstream channel at multiple speeds and said hybrid access system selectably controls speed of data transfers on said upstream channel so as to provide more effective utilization of channel bandwidth according to demand by respective remote clients communicating with said shared medium.

59. The network communication system as recited in claim 45 wherein said upstream channel protocol enables operation of said upstream channel at multiple speeds and said hybrid access system selectably controls speed of data transfers on said upstream channel whereby to provide more effective utilization of channel bandwidth according to demand by respective remote clients communicating with said shared medium.

60. The network communication system as recited in claim 46 wherein said upstream channel protocol enables operation of said upstream channel at multiple speeds and said hybrid access system selectably controls speed of data transfers on said upstream channel so as to provide more effective utilization of channel bandwidth according to demand by respective remote clients communicating with said shared medium.

61. The network communication system as recited in claim 50 wherein said upstream channel protocol enables operation of said upstream channel at multiple speeds and said hybrid access system selectably controls speed of data transfers on said upstream channel so as to provide more effective utilization of channel bandwidth according to demand by respective remote clients communicating with said shared medium.

62. The network communication system as recited in claim 40 wherein said distribution facility comprises a CATV broadcast facility, said shared medium comprises broadband broadcasts from said CATV broadcast facility, and said remote clients include broadband receivers for substantially simultaneously receiving data transmitted over said shared medium so as to provide sharing of resources located at said distribution facility.

63. The network communication system as recited in claim 62 wherein one of said upstream channels comprises a PSTN network that routes data transmitted by said remote clients to said information distribution facility which, in turn, routes said data to said server.

64. The network communication system as recited in claim 62 wherein said at least one independent upstream channel comprises a PSTN network that routes data transmitted by said remote clients directly to said server.

65. In combination with a television signal broadcast facility, a host computer and a plurality of remote clients, the improvement comprising:
   a packet distribution facility in communication with said host computer for distributing data packets from said host computer to at least one of said plurality of remote clients,
   a downstream channel that is shared by said plurality of remote clients so as to enable said remote clients to receive data packets transmitted from said host computer over a shared medium,
   at least one upstream channel for enabling said remote clients to transmit return data packets to said host computer, and
   a hybrid access system including a network manager for effecting transfers of data packets between said host computer and said remote clients, for effecting the assignment of one of a plurality of states to respective ones of said remote clients, for effecting polling of states of respective ones of said remote clients at a selectable periodicity depending upon the state of said clients and for enabling transfers of data packets from said remote clients to said host computer as a result of said polling.

66. In an asymmetric network communication system including a host server and a plurality of remote clients, an information distribution facility that distributes information signals between said host server and remote clients, a downstream channel that is shared by said plurality of remote clients to permit said plurality of remote clients to receive high speed information signals from said host server over a shared medium of said distribution facility in accordance with a downstream channel protocol, at least one upstream channel for enabling at least one of said remote clients to transmit return information signals to said host server at a lower rate than the rate of information signals transmitted over said downstream channel in accordance with an upstream channel protocol, a hybrid access system for implementing said downstream and upstream protocols including a network manager for effecting transfers of information signals between said host computer and said remote clients, for polling representations of respective ones of said remote clients at a selectable periodicity depending on the state of respective ones of said clients, for effecting the assignment of one of a plurality of states to respective ones of said remote clients and for enabling transfers of information signals from said remote clients to said host computer as a result of said polling, the combination of a respective remote link adapter associated with respective ones of said remote clients for receiving information signals transmitted from said host server in accordance with said downstream channel protocol implemented by said host server and for transmitting information signals from said remote clients to said host server in accordance with said upstream channel protocol implemented by said host server.

67. A packet delivery system for use in an asymmetric network including a host server and a plurality of remote clients operating in accordance with a high speed downstream and a lower speed upstream protocol, said packet delivery system comprising:
   a downstream channel that is shared by said remote clients so as to enable said at least one remote client to receive high speed data packets from said host server over a shared medium,
   at least one upstream channel that enables said remote clients to transmit lower speed return data packets to said host server,
   a hybrid access system for handling transfers of data packets between said host server and said remote clients over said shared medium in accordance with said upstream and downstream channel protocols, said hybrid access system including a network manager for effecting transfers of data packets between said server and said remote clients, for effecting the assignment of one of a plurality of states to respective ones of said remote clients, for polling a status register indicative of the state of respective ones of said remote clients at a selectable periodicity depending on the states of said clients and for enabling transfers of data packets from said remote clients as a result of said polling.

68. A wireless packet delivery system for use in a communication network that establishes a communications link between a host server and at least one remote client, said system comprising:
   a downstream channel that is shared by said at least one remote client for receiving data packets from said host server over a shared medium,
   at least one upstream channel that enables said at least one remote client to transmit return data packets to said host server, and
   a hybrid access system for handling transfers of data packets between said host server and said at least one remote client over said shared medium in accordance with upstream and downstream channel protocols, said hybrid access system including a network manager for effecting transfers of data between said server and said at least one remote client, for effecting polling of status indications of respective ones of said at least one remote client at a selected periodicity depending on said status indications, for effecting assignment of one of a plurality of states to respective ones of said at least one remote client and for enabling transfers of data from said at least one remote client as a result of said polling.

69. The wireless packet delivery system as recited in claim 68 wherein said network is asymmetric wherein downstream transfers of data packets are higher than upstream transfers of data packets.

70. An asymmetric network communication system including a server, a plurality of remote clients and an information distribution facility for distributing data to said remote clients, said communication system comprising:
a downstream channel that is shared by said plurality of remote clients to receive high speed data from said server over a shared medium,
at least one upstream channel that enables at least one of said remote clients to transmit lower speed return data to said server,
a hybrid access system including a network manager for effecting transfers of data between said server and said remote clients, for effecting polling of status indications of respective ones of said remote clients at a selectable periodicity depending on said status indications, for effecting the assignment of one of a plurality of status indications to respective ones of said remote clients and for enabling transfers of data from said remote clients as a result of said polling.

71. In an asymmetric communication system which includes a host server and a plurality of remote clients, an information distribution facility that distributes information signals between said host server and remote clients, a downstream channel that is shared by said plurality of remote clients to permit said plurality of remote clients to receive high speed information signals from said host server over a shared medium of said distribution facility in accordance with a downstream channel protocol, at least one upstream channel for enabling said remote clients to transmit return information signals to said host server at a lower speed than the speed of said information signals transmitted over said downstream channel in accordance with an upstream channel protocol, and a network manager for implementing said downstream and upstream protocols for effecting transfers of information between said host server and said remote clients, for effecting polling of status of respective ones of said remote clients at a selectable frequency for a given number of remote clients depending upon a detected status, for effecting the assignment of one of a plurality of states to respective ones of said remote clients and for enabling transfers of data from said remote clients to said host server in response to an assigned state, the combination including a remote link adapter associated with respective ones of said remote clients for receiving information transmitted from said host server in accordance with said downstream channel protocol implemented by said host server and for transmitting information from said remote client to said host server in accordance with said upstream channel protocol implemented by said host server.

72. In a network communication system which includes a host server, a plurality of remote clients, an information distribution facility that distributes information signals between said host server and remote clients, a downstream channel that is shared by said plurality of remote clients to convey information from said host server to said remote clients over a shared medium of said distribution facility in accordance with a downstream channel protocol, at least one upstream channel for said remote clients for conveying return information signals from said remote clients to said host server in accordance with an upstream channel protocol, and a network manager for implementing said downstream and upstream protocols for effecting transfers of information between said host server and said remote clients, for effecting polling of representations of status indications of respective ones of said remote clients at a selected polling cycle, for effecting the assignment of one of a plurality of status indications to respective ones of said remote clients and for enabling transfers of data from said remote clients to said host server in response to an assigned status, the combination of a remote interface associated with respective ones of said remote clients for receiving information signals transmitted from said host server in accordance with said downstream channel protocol implemented by said host server and for transmitting information signals from said remote client to said host server in accordance with said upstream channel protocol implemented by said host server.

73. The system as recited in claim 70, wherein said status indications reside at least at one of said hybrid access system and said remote clients.

74. The system as recited in claim 71, wherein the status indications of respective ones of said remote clients are located in a register of at least one of said network manager and said remote clients.

75. The system as recited in claim 72, wherein the status indications of respective ones of said remote clients is located in a register of at least one of said network manager and remote clients.

76. The system as recited in claim 70, wherein said at least one upstream channel is carried by a public switched telephone network.

77. The system as recited in claim 71, wherein said at least one upstream channel is carried by a public switched telephone network.

78. The system as recited in claim 71, wherein said remote link adapter includes a receiver for receiving downstream information and whose channel frequency is controlled by said network manager.

79. The system as recited in claim 72, wherein said at least one upstream channel is carried by a public switched telephone network.

80. An asymmetric network communication system comprising a host server and a plurality of remote clients, an information distribution facility that transfers information signals between said host server and remote clients, a downstream channel that is shared by said plurality of remote clients to permit said plurality of remote clients to receive high speed information signals from said host server over a shared medium of said distribution facility in accordance with a downstream channel protocol, at least one upstream channel for enabling said remote clients to transmit return information signals to said host server via said distribution facility at a lower rate than the rate of information signals transmitted over said downstream channel in accordance with an upstream channel protocol, and a network manager for providing transfers of information signals between said host server and remote clients, for polling of representations of remote clients on said high-speed downstream channel to detect requests for upstream channel allocation by respective ones of said remote clients, for allocating an upstream channel to respective ones of said remote clients for the transmission of information signals to said host server via said lower rate upstream channel, and for effectuating receipt of information from said remote clients via said lower rate upstream channel.

81. An asymmetric network communication system comprising a host server and a plurality of remote clients, an information distribution facility that transfers information signals between said host server and remote clients, a downstream channel that is shared by said plurality of remote clients to permit said plurality of remote clients to receive high speed information signals from said host server over a shared medium of said distribution facility in accordance with a downstream channel protocol, at least one upstream channel for enabling said remote clients to transmit return information signals to said host server via said distribution facility at a lower speed than the speed of information signals transmitted over said downstream channel in accordance with an upstream channel protocol, and a network manager for effectuating transfers of information signals between said host server and said remote clients via said distribution facility, for polling representations of remote clients on said high-speed downstream channel to detect requests for upstream channel allocation by respective ones of said remote clients, for verifying whether a respective one of said remote clients is authorized, for allocating an upstream channel to a respective one of said remote clients to transmit information signals to said host server via said lower speed upstream channel, and for effectuating receipt of information signals from said remote clients via said lower speed upstream channel.

82. The asymmetric network communication system as recited in claim 80, wherein respective ones of said remote clients are assigned an operating state in accordance with the status of operation thereof and said network manager polls said remote clients in accordance with a prioritized polling scheme such that certain groups of remote clients are polled at selected higher frequencies depending on the assigned state of remote clients within said group.

83. The asymmetric network communication system as recited in claim 81, wherein respective ones of said remote clients are assigned an operating state in accordance with the status of operation thereof and said network manager polls said remote clients in accordance with a prioritized polling scheme such that certain groups of remote clients are polled at selected higher rates depending on the assigned state of remote clients within said group.

84. The asymmetric network communication system as recited in claim 81, wherein said network manager allocates a specific upstream data channel frequency on which one of said remote clients is to transmit on said lower speed upstream channel.

85. The asymmetric network communication system as recited in claim 84, wherein said network manager allocates the specific upstream channel frequency according to one of quality of an available upstream channel, type of service required by one of said remote clients, operating characteristics of one of said remote clients and configuration restrictions of one of said remote clients.

86. In an asymmetric network communication system comprising a host server and a plurality of remote clients, an information distribution facility that transfers information signals between said host server and remote clients, a downstream channel that is shared by said plurality of remote clients to permit said plurality of remote clients to receive high speed information signals from said host server over a shared medium of said distribution facility in accordance with a downstream channel protocol, at least one upstream channel for enabling said remote clients to transmit return information signals to said host server via said distribution facility at a lower speed than the speed of information signals transmitted over said downstream channel in accordance with an upstream channel protocol, and a network manager for providing transfers of information between said host server and remote clients, for sending a polling signal on said high-speed downstream channel to detect representations of respective ones of said remote clients indicative of a request for a channel allocation on said upstream channel, for allocating an upstream channel for respective ones of said remote clients to transmit information signals to said host server via said lower speed upstream channel, and for effectuating receipt of information from said remote clients via said lower speed upstream channel, the combination of a remote link adapter associated with respective ones of said remote clients for interfacing said asymmetric communication network, said remote link adapter including a controller for receiving information signals over said downstream channel in accordance with said downstream channel protocol and for transmitting information signals over said upstream channel in accordance with said upstream channel protocol.

87. In an asymmetric network communication system comprising a host server and a plurality of remote clients, an information distribution facility that transfers information signals between said host server and remote clients, a downstream channel that is shared by said plurality of remote clients to permit said plurality of remote clients to receive high speed information signals from said host server over a shared medium of said distribution facility in accordance with a downstream channel protocol, at least one upstream channel for enabling said remote clients to transmit return information signals to said host server via said distribution facility at a lower speed than the speed of information signals transmitted over said downstream channel in accordance with an upstream channel protocol, and a network manager for providing transfers of information between said host server and remote clients via said distribution facility, for polling representations of remote clients on said high-speed downstream channel to detect requests for upstream channel allocation by respective ones of said remote clients, for verifying whether said remote client is authorized, for allocating an upstream channel to respective ones of said remote clients to transmit information signals to said host server via said lower speed upstream channel, and for effectuating receipt of information signals from said remote clients via said lower speed upstream channel, the combination of a remote link adapter associated with respective ones of said remote clients for interfacing said asymmetric communication network, said remote link adapter including a controller for receiving information signals over said downstream channel in accordance with said downstream channel protocol and for transmitting information signals over said upstream channel in accordance with said upstream channel protocol.

88. An asymmetric network communication system including a host server, a plurality of remote clients and a data distribution facility for distributing data to said remote clients, said communication system comprising:

a downstream channel that is shared by said plurality of remote clients to receive downstream data from said server over a shared medium at a high rate, a plurality of upstream channels that enable said remote clients to transmit upstream data to said server at a lower rate, and a network manager for effectuating transfers of data between said host server and remote clients, for effecting polling to detect representations of respective ones of said remote clients on said downstream channel wherein said representations are indicative of requests for allocation of an upstream channel, for allocating one of said plurality of upstream channels to one of said remote clients for the transmission of data to said host server via said upstream channel, and for effectuating receipt of data from said one of said remote clients via said upstream channel.

89. The network communication system as recited in claim 88 wherein one of said upstream channels and said downstream channel reside in different communication media.

90. The network communication system as recited in claim 88 wherein said shared medium comprises a hybrid fiber coaxial cable and said remote clients physically connect in parallel to said hybrid fiber coaxial cable to receive simultaneously broadcasted data whereby to facilitate efficient sharing of resources at said distribution facility by said remote clients.

91. The network communication system as recited in claim 90 wherein one of said upstream channels comprises a PSTN network that routes data transmitted by said at least one remote client to said information distribution facility which, in turn, routes said data to said server.

92. The network communication system as recited in claim 91 wherein one of said upstream channels comprises a PSTN network that routes data transmitted by said at least one remote client directly to said server.

93. The network communication system as recited in claim 90 wherein one of said upstream channels comprises an independent lower speed channel transmitted over said hybrid fiber coaxial cable, and said upstream router receives said data transmitted by said at least one remote client over said independent upstream channel and routes said data to said server.

94. The network communication system as recited in claim 88 wherein said distribution facility comprises a cellular broadcast facility, said shared medium comprises radio frequency broadcasts from said cellular broadcast facility, and said remote clients each comprise radio frequency receivers for substantially simultaneously receiving data transmitted over said shared medium so as to provide sharing of resources at said distribution facility by said remote clients.

95. The network communication system as recited in claim 94 wherein one of said upstream channels comprises a lower speed cellular return channel routed through said distribution facility.

96. The network communication system as recited in claim 88 wherein said distribution facility comprises a direct broadcast satellite, said shared medium comprises electromagnetic transmissions from said direct satellite broadcast and said remote clients include a receiver for substantially simultaneously receiving data from said broadcast so as to provide sharing of resources among said remote clients.

97. The network communication system as recited in claim 96 wherein one of said upstream channels comprises a PSTN network that routes data transmitted by said remote clients directly to said server.

98. The network communication system as recited in claim 88 wherein each of said upstream and downstream channels resides in a communication medium selected from one of a transmission of a CATV distribution network, a cell site, a radio transmitter station, a television transmitter station, a hybrid fiber coaxial cable network, an over-the-air wireless network, a direct broadcast satellite communication network and a telephone network.

99. The network communication system as recited in claim 88 wherein said distribution facility comprises a television broadcast facility, said shared medium comprises radio frequency broadcasts from said television broadcast facility, and said remote clients include radio frequency receivers for substantially simultaneously receiving data transmitted over said shared medium whereby to provide sharing of resources located at said distribution facility.

100. The network communication system as recited in claim 99 wherein one of said upstream channels comprises a PSTN network that routes data transmitted by said remote clients to said information distribution facility which, in turn, routes said data to said server.

101. The network communication system as recited in claim 100 wherein one of said upstream channels comprises a PSTN network that routes data transmitted by said remote clients directly to said server.

102. The network communication system as recited in claim 88 wherein said distribution facility comprises a broadband broadcast facility, said shared medium comprises electromagnetic broadcasts from said broadband broadcast facility, and said remote clients include receivers for substantially simultaneously receiving data transmitted over said shared medium whereby to provide sharing of resources located at said distribution facility.

103. The network communication system as recited in claim 102 wherein one of said upstream channels comprises a PSTN network that routes data transmitted by said at least one remote client to said information distribution facility which, in turn, routes said data to said server.

104. The network communication system as recited in claim 102 wherein one of said upstream channels comprises a PSTN network that routes data transmitted by said at least one remote client directly to said server.

105. The network communication system as recited in claim 91 wherein said upstream channel protocol enables operation of said upstream channel at multiple speeds and said hybrid access system selectably controls speed of data transfers on said upstream channel so as to provide more effective utilization of channel bandwidth according to demand by respective ones of said remote clients communicating with said shared medium.

106. The network communication system as recited in claim 88 wherein said upstream channel protocol enables operation of said upstream channel at multiple speeds and said hybrid access system selectably controls speed of data transfers on said upstream channel so as to provide more effective utilization of channel bandwidth according to demand by respective remote clients communicating with said shared medium.

107. The network communication system as recited in claim 93 wherein said upstream channel protocol enables operation of said upstream channel at multiple speeds and said hybrid access system selectably controls speed of data transfers on said upstream channel whereby to provide more effective utilization of channel bandwidth according to demand by respective remote clients communicating with said shared medium.

108. The network communication system as recited in claim 94 wherein said upstream channel protocol enables operation of said upstream channel at multiple speeds and said hybrid access system selectably controls speed of data transfers on said upstream channel so as to provide more effective utilization of channel bandwidth according to demand by respective remote clients communicating with said shared medium.

109. The network communication system as recited in claim 98 wherein said upstream channel protocol enables operation of said upstream channel at multiple speeds and said hybrid access system selectably controls speed of data transfers on said upstream channel so as to provide more effective utilization of channel bandwidth according to demand by respective remote clients communicating with said shared medium.

110. The network communication system as recited in claim 88 wherein said distribution facility comprises a CATV broadcast facility, said shared medium comprises broadband broadcasts from said CATV broadcast facility, and said remote clients include broadband receivers for substantially simultaneously receiving data transmitted over said shared medium so as to provide sharing of resources located at said distribution facility.

111. The network communication system as recited in claim 110 wherein one of said upstream channels comprises a PSTN network that routes data transmitted by said remote clients to said information distribution facility which, in turn, routes said data to said server.

112. The network communication system as recited in claim 110 wherein said at least one independent upstream channel comprises a PSTN network that routes data transmitted by said remote clients directly to said server.

113. A two-way asymmetric communication system for effecting communications with at least a single remote data processor, said asymmetric communication system comprising:
 a network including:
  a shared medium including a downstream channel, and an upstream channel which is independent of said downstream channel, said upstream channel conveying information at a lower speed that said downstream channel;
 a downstream router in communication with said network to send information over said shared medium;
 an upstream router in communication with said network to receive lower speed return information over said upstream channel;
 a common network management system operating on a unitary control platform and in communication with said downstream router and said upstream router to effect transmission of information over said shared medium in an interactive session in accordance with a high speed downstream channel protocol, and to enable transfer of return information over said network in accordance with a lower speed upstream channel protocol;
 a broadcast unit connected to said downstream router and in communication with said downstream channel, said broadcast unit being capable of providing point-to-multipoint broadcast links on said network over said shared medium; and
 remote interface equipment associated with said single remote data processor to enable said single remote data processor to communicate over said upstream channel and said downstream channel.

114. The two way asymmetric communication system according to claim 113, wherein said common network management system communicates with said upstream router and downstream router over a common physical link for controlling transmission of information by said upstream router and said downstream router.

115. The two way asymmetric communication system according to claim 114 further including a host server and said common network management system enables interactive two way communication between said host server and said at least one remote data processor.

116. The two way asymmetric communication system according to claim 115 wherein said independent upstream channel includes at least one of a telephone network, direct broadcast satellite network, a cable TV network and a wireless transmission path.

117. The two way asymmetric communication system according to claim 113 wherein said network further includes a switch.

118. The two way asymmetric communication system according to claim 113, wherein said broadcast unit includes at least one of a group consisting of a cable TV headend, a wireless TV transmitter, a satellite transmitter and a cell site.

119. A two-way asymmetric communication system for providing interactive communication between a server and a plurality of remote clients, said system including an information distribution network for distributing information signals to said plurality of remote clients, said system comprising:
 a shared downstream medium that is shared by said plurality of remote clients to receive high-speed data packets from said server via a downstream channel;
 an independent upstream channel independent of said downstream channel, to enable at least one of said plurality of remote clients to convey lower-speed return data packets to said server; and
 a network management system that effects control at a common communication layer of network sessions between said server and said at least one of said plurality of remote clients of both high-speed data packets from said server to said plurality of remote clients via broadcasts over said shared downstream medium in accordance with a high-speed downstream channel protocol and lower-speed return data packets from said at least one of said plurality of remote clients to said server over said independent upstream channel in accordance with an upstream channel protocol, said network management system being operated with a point-to-multipoint communication path between said server and said plurality of remote clients.

120. The two-way asymmetric communication system according to claim 119, wherein:
 said common network management system has control of both said high-speed data packets over said shared downstream medium and said lower-speed return data packets over said independent upstream channel at a common physical layer.

121. The asymmetric communication system as recited in claim 120, further comprising:
 a downstream router in communication with said shared downstream medium and responsive to said common network management system to establish a link with said at least one of said plurality of remote clients over said shared downstream medium; and
 an upstream router responsive to said common network management system that sends information signals over said independent upstream channel to establish a link with said at least one of said plurality of remote clients;
 said plurality of remote clients including respective remote interfaces.

122. The asymmetric communication system as recited in claim 121, wherein said independent upstream channel lies in a communication medium that is different from said shared downstream medium.

123. The asymmetric communication system as recited in claim 119, wherein:
 said shared downstream medium comprises a hybrid fiber coaxial cable; and said plurality of remote clients connect physically in parallel to a cable portion of said hybrid fiber coaxial cable to receive simultaneously broadcast data packets to facilitate efficient sharing of resources at a distribution facility by said plurality of remote clients.

124. The asymmetric communication system as recited in claim 121, wherein said independent upstream channel comprises a PSTN network that routes data packets transmitted by said at least one of said plurality of remote clients to said information distribution network which, in turn, routes said data packets to said server.

125. The asymmetric communication system as recited in claim 121, wherein each of said independent upstream channel and said downstream medium lies in a communication medium selected from one of a CATV distribution network, a cell site, a radio transmission medium, a television transmission medium, a hybrid fiber coaxial cable network, an over-the-air wireless network, a direct broadcast satellite communication network and a telephone network.

126. A network communication system including a host, a plurality of remote users and an information distribution network including a shared medium for distributing information signals to said plurality of remote users, said network communication system comprising:
    a downstream channel shared by said plurality of remote users to receive information signals transmitted from said host over said shared medium at a high speed,
    at least one independent upstream channel independent from said downstream channel to enable said plurality of remote users to convey information signals to said host at a lower speed than said high speed of said downstream channel; and
    an access system to enable a transfer of information signals from said host to said plurality of remote users over said distribution network via broadcasts over said shared medium in accordance with a high speed downstream channel protocol, and to enable a transfer of information signals from said plurality of remote clients to said host at said lower speed over said at least one independent upstream channel in accordance with an upstream channel protocol, said access system being operable to provide a two-way session between said host and at least one of said plurality of remote users including a point-to-multipoint path between said host and said plurality of remote users, said access system including:
        an interface in communication with said host,
        a downstream path for conveying high speed information to said plurality of remote users over said shared medium,
        an upstream path for conveying return information from said plurality of remote users, and
        a network management system for managing communications over both said downstream path and said upstream path, respectively, at physical layers so that said network management system may handle transferred data irrespective of one of a link layer and network layer protocol employed by said plurality of remote users and said host.

127. The network communication system as recited in claim 126, wherein said system includes asymmetric media wherein a medium for each of said downstream channel and said at least one independent upstream channel is selected from one of a CATV distribution network, a cell site, a television transmission medium, a hybrid fiber coaxial cable network, an over-the-air wireless network, a direct broadcast satellite communication network and a telephone network.

128. The network communication system as recited in claim 127, wherein:
    said upstream channel protocol effects operation of said at least one independent upstream channel at multiple speeds; and
    said access system selectably effects control of speeds of data transfers on said at least one independent upstream channel.

129. A client-server network including a host server, a plurality of remote clients and a distribution facility for distributing data packets to said plurality of remote clients, said client-server network comprising:
    at least one downstream channel that is shared by said plurality of remote clients, for receiving high speed data packets from said host server over a shared medium;
    at least one independent upstream channel that carries lower speed return data packets from said plurality of remote clients to said host server;
    a network management that effects within a common control unit transfers of data packets from said host server to said plurality of remote clients via broadcasts from said distribution facility over said shared medium in accordance with a high speed downstream channel protocol, and that effects within said common control unit transfers of lower speed return data packets from said plurality of remote clients to said host server over an independent upstream channel located on a physical medium that is different from said shared medium of said downstream channel, said independent upstream channel being assigned in accordance with an upstream channel protocol and channel control information transmitted on said downstream channel, said common network management system being operable to provide two-way communication between said host server and said plurality of remote clients;
    an interface that enables communications between said common network management system and said host server;
    downstream routing equipment that conveys high speed data packets to said plurality of remote clients over said shared medium; and
    upstream routing equipment that receives return data packets from said plurality of remote clients and that effects conveyance of said return data packets to said host server.

130. The client-server network as recited in claim 129, wherein said common network management system effects control of assignment of upstream channels to said plurality of remote clients in accordance with scheduling information including at least one of a channel request signal, a channel availability signal, a priority status signal and a class of service signal.

131. The client-server network as recited in claim 129, wherein said network includes asymmetric media where a communication medium for each of said downstream channel and said at least one independent upstream channel is selected from one of a CATV distribution network, a cell site, a television transmission medium, a hybrid fiber coaxial cable network, an over-the-air wireless network, a direct broadcast satellite communication network and a telephone network.

132. The client-server network as recited in claim 129 wherein:
    said upstream channel protocol enables operation of said at least one independent upstream channel at multiple speeds; and said common network management system selectably effects control of speeds of data transfers on said at least one independent upstream channel.

133. A client-server system including a split-channel asymmetric network for enabling multiple users to share information, said client-server system comprising:

a host server;

a plurality of remote users;

a distribution network for distributing information signals to said plurality of remote users;

a downstream channel that is shared by said plurality of remote users to enable said plurality of remote users to receive high speed data packets from said host server over a shared medium;

at least one upstream channel that is independent of said downstream channel, to enable said plurality of remote users to convey return data packets to said host server at a lower speed than a data packet rate transmitted in said downstream channel;

an access system that directly controls, at a network layer or lower, both a transfer of data packets from said host server to said plurality of remote users via broadcasts over said shared medium in accordance with a high speed downstream channel protocol, and a transfer of lower speed return data packets from said plurality of remote users to said host server over said at least one upstream channel in accordance with an upstream channel protocol, said access system being operable to provide two-way communication between said host server and said plurality of remote users in an interactive session wherein transmission of upstream information is controlled, in part, by control information transmitted over said downstream channel, said access system comprising:

a host interface that enables communication with said host server, a downstream path to route high speed data packets to said plurality of remote users over said shared medium, an upstream path for conveying return data packets from said plurality of remote users, and a common network management system operating on a unitary control platform for managing information flow over said downstream path and said upstream path, respectively, at a selected one of a common network layer and link layer.

134. In combination with a multi-user computer system including at least one host computer and a plurality of remote clients, the improvement comprising:

a packet distribution network in communication with said at least one host computer for distributing data packets from said at least one host computer to said plurality of remote clients;

a downstream channel residing in a medium shared by said plurality of remote clients to enable said plurality of remote clients to receive high speed data packets from said at least one host computer;

at least one upstream channel that is independent of said downstream channel, to enable said plurality of remote clients to convey return data packets to said at least one host computer at a speed that is lower than a data packet rate transmitted in said downstream channel;

a downstream switching path to enable transmission of high speed data packets to said plurality of remote clients over said shared medium;

an upstream switching path for conveying return data packets from said plurality of remote clients; and a common network management system operating on a unitary control platform without internal link layer or network layer control paths, located at a headend facility of an information distribution network to effect conveyance of data packets from said at least one host computer to said plurality of remote clients via broadcasts over said shared medium in accordance with a high speed downstream channel protocol, and conveyance of lower speed return data packets from said plurality of remote clients to said at least one host computer over said at least one independent upstream channel in accordance with an upstream channel protocol, said common network management system being operable with a two-way network that includes a point-to-multipoint communication path between said at least one host computer and said plurality of remote clients.

135. In combination with a CATV broadcast transmission facility including a shared medium downstream channel that is shared by a plurality of remote clients to receive high speed data packets from a host server, the improvement comprising:

respective remote RF interfaces associated with said plurality of remote clients in communication with said shared medium and tuned to receive high speed transfers of data packets for conveyance to said plurality of remote clients;

at least one independent upstream channel that carries lower speed return data packets to said host server from a respective at least one of said plurality of remote clients;

a common network management system operating on a unitary control platform without internal link layer or network layer control paths, located at a central headend facility of a data distribution network to effect conveyance of data packets from said host server to said plurality of remote clients via broadcasts over said shared medium in accordance with a high speed downstream channel protocol, and conveyance of lower speed return data packets from said plurality of remote clients to said host server over said at least one independent upstream channel in accordance with an upstream channel protocol, said common network management system being operable to provide two-way communication with a network that includes a point-to-multipoint communication path between said host server and said plurality of remote clients in a session wherein transmission of upstream information is at least one of monitored and controlled, at least in part, by said common network management system, said common network management system including:

an interface that communicates with said host server, a downstream routing path to enable transmission of high speed data packets to said plurality of remote clients over said shared medium at one of a network layer and a link layer, and an upstream routing path for conveying return data packets from said plurality of remote clients at one of a network layer and a link layer.

136. The improvement as recited in claim 135, wherein communication media for each of said shared medium downstream channel and said at least one independent upstream channel is selected from one of a CATV distribution network, a cell site, a television transmission medium, a hybrid fiber coaxial cable network, an over-the-air wireless network, a direct broadcast satellite communication network and a telephone network.

137. The improvement as recited in claim 136, wherein:

said upstream channel protocol enables operation of said at least one independent upstream channel at multiple speeds; and said common network management system selectably effects control of speeds of data transfers on said at least one independent upstream channel.

138. In combination with a satellite broadcast facility, the improvement comprising:

a host computer;

a plurality of remote clients;

an information distribution facility in communication with said host computer, to distribute information from said host computer to said plurality of remote clients;

a shared broadcast medium including a downstream channel that is shared by said plurality of remote clients to receive high speed data packets from said host computer;

at least one upstream channel that is independent of said downstream channel, to enable said plurality of remote clients to convey return data packets to said host computer at a lower speed than an information transfer rate of said downstream channel; and a common network management system that effects a transfer of information from said host computer to said plurality of remote clients via broadcasts over said shared broadcast medium in accordance with a high speed downstream channel protocol and a transfer of lower speed return information from said plurality of remote clients over said at least one upstream channel in accordance with an upstream channel protocol, said common network management system being operable in a two-way network that includes a point-to-multipoint communication path between said host computer and said plurality of remote clients.

139. A packet delivery system for use in an asymmetric network to provide two-way communication, said packet delivery system including a host server and at least one remote client, said at least one remote client including an RF interface operating in accordance with a high speed downstream protocol and a low speed interface operating in accordance with a lower speed upstream protocol, said packet delivery system comprising:

a shared medium including a downstream channel that is shared by said at least one remote client, to receive high speed data packets from said host server;

at least one independent upstream channel that enables said at least one remote client to convey lower speed return data packets to said host server;

an access system to effect control of data packets from said host server to said at least one remote client over said shared medium in accordance with said high speed downstream protocol, and to monitor communication over said at least one independent upstream channel thereby to schedule upstream communication in accordance with a predefined rule, said access system including:

an interface that enables communication with said host server, a downstream routing device to send high speed data packets to said at least one remote client over said shared medium, an upstream routing device to receive return data packets from said at least one remote client, and a common network management system located at a headend facility of a data distribution network for managing said downstream router and said upstream router.

140. The packet delivery system as recited in claim 139, wherein said access system effects control of assignment of said at least one independent upstream channel to said at least one remote client to assign one of a shared channel and a dedicated channel to said at least one remote client.

141. The packet delivery system as recited in claim 140, wherein said access system effects switching of channel assignments of said at least one remote client between shared and dedicated upstream channels.

142. A method of two-way asymmetric communication comprising:

providing a shared downstream channel;

providing an independent upstream channel independent of said shared downstream channel;

transmitting information over said shared downstream channel in accordance with a high speed downstream channel protocol;

receiving lower speed return information over said independent upstream channel in accordance with a lower speed upstream channel protocol, said lower speed upstream channel carrying information at a lower speed than that of said shared downstream channel;

effecting management of both said transmission of information over said shared downstream channel and said reception of said lower speed return information over said independent upstream channel by a network management system operating on a unitary control platform that effects control of said upstream and downstream transmissions at a network layer or lower;

providing point-to-multipoint broadcast links over said shared downstream channel; and enabling said single remote data processor to communicate over said independent upstream channel and said shared downstream channel.

143. A method of two-way asymmetric communication with a plurality of remote clients in an information distribution network including a server, said method comprising:

sharing a downstream medium among said plurality of remote clients;

receiving high-speed information signals from said server by at least one of said plurality of remote clients via said downstream medium;

conveying lower-speed return data packets to said server from said at least one of said plurality of remote clients over an independent upstream channel independent of said downstream medium; and controlling, in a common network management system, both a conveyance of said high-speed data packets from said server to said at least one of said plurality of remote clients via broadcasts over said shared downstream medium in accordance with a high-speed downstream channel protocol, and a conveyance of lower-speed return data packets from said at least one of said plurality of remote clients to said server over said independent upstream channel in accordance with an upstream channel protocol; and whereby a point-to-multipoint communication path is provided between said server and said plurality of remote clients.

144. A method of managing the conveyance of upstream and downstream data packets in an asymmetric communication system, comprising:

distributing data packets from a host computer to a plurality of remote clients;

enabling said plurality of remote clients to receive high speed data packets from said host computer over a shared downstream channel shared by said plurality of remote clients;

enabling said plurality of remote clients to convey return data packets to said host computer over an upstream channel that is independent of said shared downstream channel at a speed that is lower than a data packet rate transmitted in said downstream channel;

managing, in a common network management unit operating on a unitary control platform, both the conveyance of data packets from said host computer to said plurality of remote clients via broadcasts over said shared downstream channel in accordance with a high speed downstream channel protocol, and the conveyance of lower speed return data packets from said plurality of remote clients to said host computer over said upstream channel in accordance with an upstream channel protocol, said common network management system being operable with a two-way network that includes a point-to-multipoint communication path between said host computer and said plurality of remote clients;

enabling a downstream routing device at a network layer or lower to transmit high speed data packets to said plurality of remote clients over said shared downstream channel; and enabling an upstream routing device at a network layer or lower to convey return data packets from said plurality of remote clients.

* * * * *